United States Patent [19]
Saito et al.

[11] Patent Number: 5,779,337
[45] Date of Patent: Jul. 14, 1998

[54] PLANE LIGHT SOURCE UNIT AND LIGHT GUIDE USED THEREIN

[75] Inventors: Shinichiro Saito, Hachioji; Norio Nakamura, Tokyo; Yasuo Shono, Tokyo; Yoshinori Higuchi, Tokyo; Atsunori Ohyama, Tokyo, all of Japan

[73] Assignees: Konica Corporation, Tokyo; Toshiba Corporation, Kanagawa-ken, both of Japan

[21] Appl. No.: 691,807

[22] Filed: Jul. 31, 1996

[30] Foreign Application Priority Data

| May 30, 1996 | [JP] | Japan | 8-136278 |
| May 13, 1996 | [JP] | Japan | 8-117800 |
| Jul. 23, 1996 | [JP] | Japan | 8-193646 |

[51] Int. Cl.⁶ ............................................. F21V 7/04
[52] U.S. Cl. ........................ 362/31; 362/26; 362/328; 362/330; 362/331
[58] Field of Search ............................ 362/26, 27, 31, 362/97, 330, 328, 331

[56] References Cited

U.S. PATENT DOCUMENTS

| 5,485,291 | 1/1996 | Qiao et al. | 349/62 |
| 5,485,354 | 1/1996 | Ciupke et al. | 362/31 |
| 5,575,549 | 11/1996 | Ishikawa et al. | 362/31 |

*Primary Examiner*—Stephen F. Husar
*Attorney, Agent, or Firm*—Frishauf, Holtz, Goodman, Langer & Chick

[57] ABSTRACT

A plane light source unit includes a tubular light source, and a light guide. The light guide has a light emitting surface and a reflecting surface in addition to a light incident face placed near the tubular light source to receive light emitted from the tubular light source. The light guide has a plurality of projections or grooves arrayed on the light emitting surface to extend parallel to each other along a longitudinal direction of the tubular light source so as to cause the light incident from the light incident face to emerge from the light emitting surface. The height or depth of each of the projections or grooves increases from the central portion to the two end portions in the longitudinal direction of the tubular light source.

48 Claims, 36 Drawing Sheets

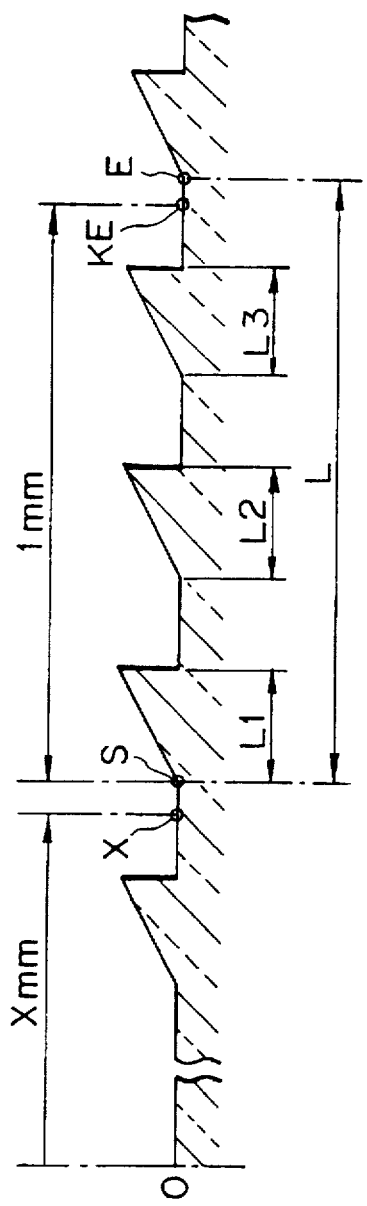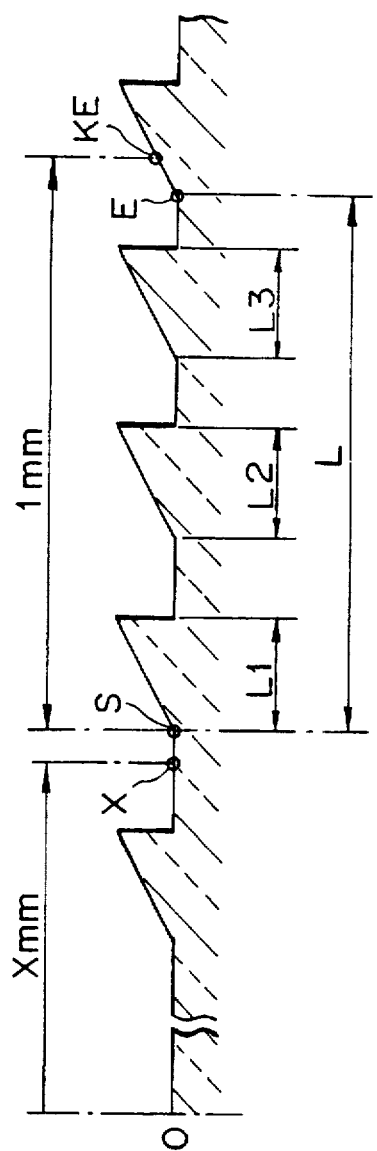

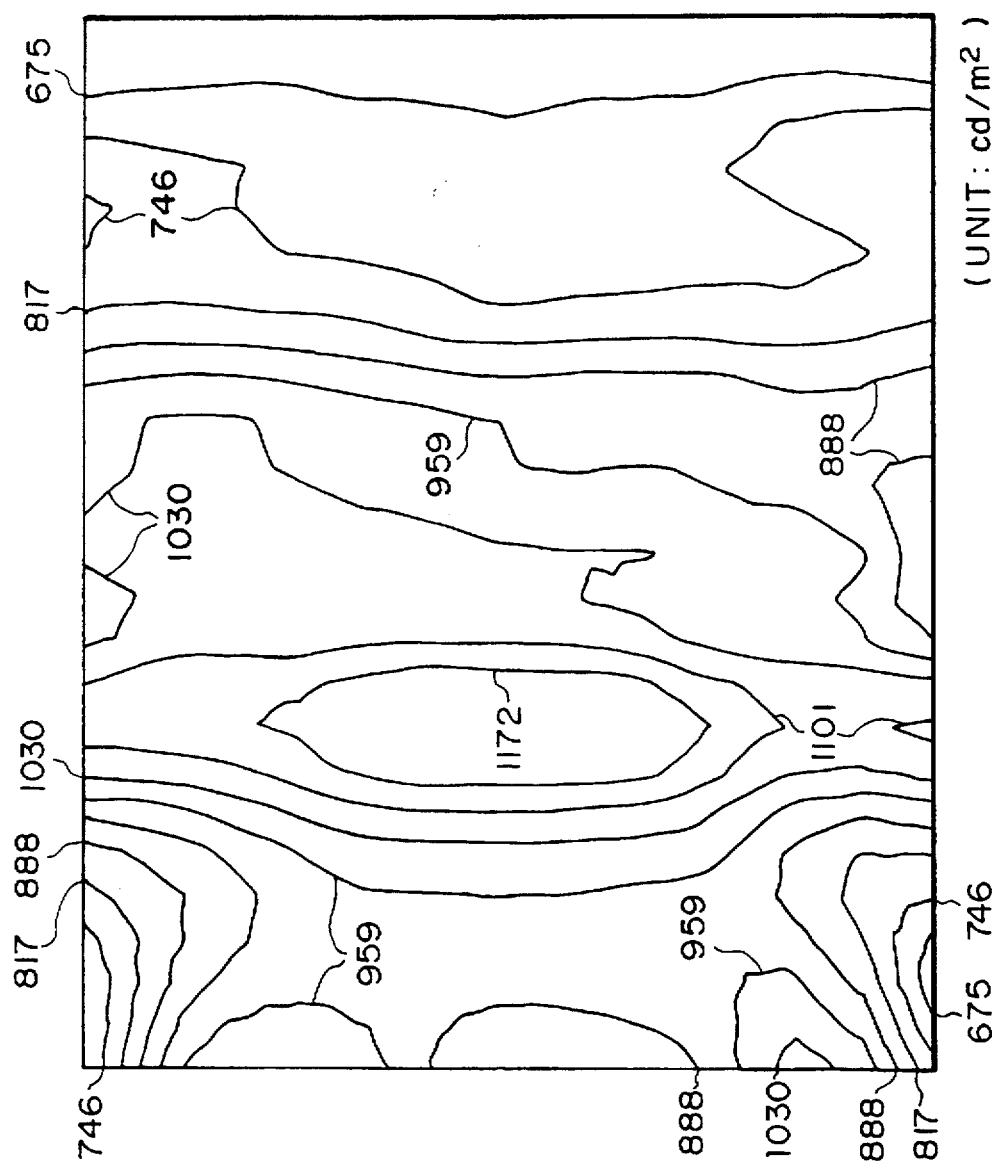

5,779,337

PLANE LIGHT SOURCE UNIT AND LIGHT GUIDE USED THEREIN

BACKGROUND OF THE INVENTION

1. Field of the Invention

The present invention relates to a plane light source unit and, more particularly, to a plane light source unit of an edge light system and a light guide used therein.

2. Description of the Prior Art

Display devices represented by liquid crystal display devices are low-profile, lightweight, and low-power consumption devices. Owing to these characteristics, such display devices have recently been used for TV sets, computers, car navigation systems, and the like.

For example, a transmission type liquid crystal display device includes a liquid crystal panel having a liquid crystal layer held between a pair of electrode substrates, and a plane light source unit arranged on the rear surface side of the liquid crystal panel to guide light onto the liquid crystal panel.

In recent years, as a plane light source unit, an edge light system has been frequently used, because the edge light system is advantageous to make the unit a thin type.

As disclosed in Japanese Unexamined Utility Model Publication No. 63-24529, a plane light source unit of the edge light system includes a tubular light source and a light guide in the form of a thin plate made of an acrylic resin or the like. A milk-white scattering pattern is printed on the lower surface of the plate. One end face of the light guide is located near the tubular light source. Light emitted from the tubular light source propagates in the light guide and is scattered by the scattering pattern on the lower surface of the light guide. The light then emerges from the upper major surface of the light guide.

The structures of conventional plane light source units of the edge light system will be described below with reference to the accompanying drawings.

Referring to FIG. 1, reference numeral 2001 denotes a tubular light source; 2002, a reflecting plate for reflecting light emitted from the tubular light source 2001 to the right side on the drawing; and 2003, a light guide in which light from the tubular light source 2001 propagates.

In the light guide 2003, a surface facing an object to be irradiated and a flat surface part on the upper surface of the light guide 2003 is defined as a light emitting surface 2004; a surface on the opposite side to the light emitting surface 2004, as a reflecting surface 2005; and a face on which light from the tubular light source 2001 is incident and is substantially perpendicular to the light emitting and the reflecting surfaces 2004 and 2005, as an light incident face 2006. A diffusion sheet 2007 is placed above the light emitting surface 2004. A reflecting sheet 2008 is placed below the reflecting surface 2005. A liquid crystal panel 2010 as an object to be irradiated is placed above the diffusion sheet 2007 via a collimation sheet 2009.

The operation of the plane light source unit of the edge light system having the above structural feature will be described next.

Light emitted from the tubular light source 2001 enters the light guide 2003 through the light incident face 2006 of the light guide 2003. If the light guide 2003 has no inventive feature, the light which has entered the light guide 2003 hardly emerges from the light emitting surface 2004 or the reflecting surface 2005. For this reason, the light emitting surface 2004 or the reflecting surface 2005 has a function of guiding light out of the light guide 2003.

The light emerging from the light emitting surface 2004 of the light guide 2003 emerges obliquely with respect to the light emitting surface 2004, and undergoes a diffusion effect on the diffusion sheet 2007. The light is then collimated by the collimation sheet 2009 placed above the diffusion sheet 2007 in a direction almost perpendicular to the rear surface of the liquid crystal panel 2010 to irradiate the liquid crystal panel 2010.

The function of guiding light propagating in the light guide 2003 to the outside will be described next.

In the case of a conventional diffusion type light guide, a scattering pattern are printed on the reflecting surface 2005 of the light guide 2003. When light propagating the light guide 2003 impinges on the scattering pattern, the light undergoes an irregular reflection effect. Part of the light emerges downward from the reflecting surface 2005 of the light guide 2003 and is reflected by the reflecting sheet 2008 to propagate toward the liquid crystal panel 2010. Part of the remaining light is irregularly reflected by the scattering pattern toward the light emitting surface 2004. Part of the reflected light emerges from the light guide 2003 through the light emitting surface 2004. That is, the scattering pattern serve as a pseudo-light source.

Considering that the amount of light propagating in the light guide 2003 decreases with an increase in distance from the tubular light source 2001, the scattering pattern is sparsely formed at portions near the tubular light source 2001, whereas the scattering pattern is formed densely at portions remote from the tubular light source 2001, thereby uniformly illuminating the liquid crystal panel 2010. That is, the printing density of the scattering pattern is increased with an increase in distance from the tubular light source 2001.

However, since light is absorbed by the scattering pattern, the utilization efficiency of light is poor, and the power consumption of the light source is large.

To replace such a diffusion type light guide, an optical light guide (a light guide designed to optically control a method of guiding light propagating in the light guide to the outside) has been proposed. This optical light guide can reduce the light absorption loss as compared with the diffusion type light guide.

One embodiment using the optical light guide is disclosed in Japanese Unexamined Utility Model Publication No. 6-16902.

FIG. 2 shows the main part of the light guide disclosed in Japanese Unexamined Utility Model Publication No. 6-16902. Referring to FIG. 3, projections 3005 each having a cross-sectional shape with three inclined projection surfaces 3051, 3052, and 3053 in a direction perpendicular to a light incident face are formed on a light emitting surface 3004 of a light guide 3003. The pitch of the projections 3005 gradually decreases with an increase in distance from the light source. Light incident on each projection 3005 emerges from the light guide 3003 at about right angles with respect to the light emitting surface 3004 owing to the characteristics of the shape of the projection.

According to such a plane light source unit, since reflection and refraction are controlled, and light of which a luminance peak is directed toward such a direction as being perpendicular to the light emitting surface 3004, the utilization efficiency of light can be greatly improved.

However, a further study conducted by the present inventors has found the following problems in the optical light guide. There are provided non light-emitting electrodes at each edge portion of the tubular light source. As a result, light-emission irregularity due to the tubular light source itself is caused in the longitudinal direction thereof. If any counter-measure to this problem, luminance irregularity is generated in the longitudinal direction of the tubular light source.

Further, minute burrs and the like are inevitably formed on the corner portions of a light guide in the manufacturing process. Since such an optical light guide is designed to use substantially only reflection and refraction, the plate is influenced by undesired light incident from the burr portions, resulting in luminance irregularity in the form of fringes within an effective emission region of the light emitting surface.

Still further, moire patterns may be generated by interference between the pitch of the prism projections of the light guide, the prism pitch of the collimation sheet, and the pixel pitch of the display device.

In addition, since light emitted from the plane light source unit exhibits a considerable directivity characteristic, the viewing angle characteristic deteriorates when the plate is used for a liquid crystal display device or the like.

Each projection 3005 formed on the light guide disclosed in Japanese Unexamined U.M. Publication No. HEI 6-16902 is formed such that the inclined projection surface 3053 is an undercut portion in a front view of the light emitting surface 3004 with the projection 3005. For this reason, a slide mold which moves in a direction perpendicular to the drawing is required to manufacture the light guide 3003 by a molding method using a metal mold. Such a light guide is not suitable for mass production.

These projections 3005 may be formed by using a machine (e.g., a lathe). However, such a method is not practical when a process time is taken into consideration.

Furthermore, if the pitch of the projections 3005 formed on the light guide is simply reduced with an increase in distance from the tubular light source, luminance irregularity occurs in a direction perpendicular to the tubular light source on the light emitting surface of the light guide.

SUMMARY OF THE INVENTION

The present invention has been made to solve the above problems in the prior arts, and has as its object to provide a plane light source unit which can obtain a high luminance by sufficiently improving the utilization efficiency of light, eliminates luminance irregularity, can easily control moire, and greatly improve the productivity, and a light guide used in the unit.

According to the first basic aspect of the present invention, in order to achieve the above object, there is provided a plane light source unit comprising:

a tubular light source; and a light guide having a light emitting surface and a reflecting surface in addition to a light incident face placed near the tubular light source to receive light emitted from the tubular light source, wherein the light guide has a plurality of projections arrayed on the light emitting surface to extend parallel to each other along a longitudinal direction of the tubular light source so as to cause the light incident from the light incident face to emerge from the light emitting surface, and a height of each of the projections increases from a central portion to two end portions in the longitudinal direction of the tubular light source.

In the first basic aspect, when a ratio of areas of bottom surfaces of the projections to a unit area of an effective emission region of the light emitting surface is defined as a projection area ratio, a projection area ratio of the projections formed on a portion near the tubular light source is preferably different from that of the projections formed on a portion spaced apart from the tubular light source.

In the first basic aspect, an average of arrangement pitches of the projections in the effective emission region of the light emitting surface is preferably not more than 200 μm.

The plane light source unit according to the first basic aspect preferably further comprises diffusion means placed near the light emitting surface to guide light emerging from the light emitting surface in a direction perpendicular to the light emitting surface.

The diffusion means preferably controls the emergent light such that a direction of a luminance peak of the light emerging from the diffusion means is set within 30° with respect to a direction perpendicular to the light emitting surface.

The diffusion means has a convergence coefficient of 2 to 4, and a haze of 70 to 95%.

The diffusion means preferably comprises one or two diffusion sheets.

The plane light source unit according to the first basic aspect preferably further comprises a collimation sheet for collimating the light emerging from the diffusion means.

In the plane light source unit according to the first basic aspect, the collimation sheet preferably has a plurality of prisms arrayed in a direction substantially coinciding with an array direction of the projections.

In the first basic aspect, the projections are preferably formed to satisfy $15<A<20$ in case of $100<L<162$ where the average of the projection area ratios of the projections is defined as A (%), and the length of the effective emission region of the light emitting surface in a direction perpendicular to the light incident face is defined as L (mm).

In the first basic aspect, in case of $100<L<162$, letting x be a distance (mm) from an emission start position as a side end of the effective emission region which is nearest to the tubular light source to an arbitrary position outside any projection on a straight line passing through a center of the effective emission region of the light emitting surface and crossing the light incident face at a right angle, and Rx be a projection formation ratio which is a ratio of a total length of bases of all the projections present within a predetermined distance from a start point as a start position of the projection nearest to the position x to an end point as a predetermined position in a direction opposite a light incident face direction to the predetermined distance, the projections are formed to satisfy $S(x)-5<Rx<S(x)+5$ for $S(x)=e^{f(x)}$ wherein e is the base of a natural logarithm, $f(x)=0.00005(x+65)^2+1.3$, $S(x)=5$ when $S(x)<5$, and $S(x)\pm95$ when $S(x)>95$, provided that when the end point is outside any projection, a start position of a first projection counted from the end position in the direction opposite the light incident face direction is regarded as an end point, and when the end point is present on a projection, a start position of the projection on which the end point is present is regarded as an end point.

In the first basic aspect, the projection preferably has a prism-like shape without any undercut.

In the first basic aspect, the projection preferably satisfies the following inequality on a straight line passing through a center of the effective emission region of the light emitting surface and crossing the light incident face at a right angle:

3.0>(length of base of prism)/(height of prism)>1.0

In the first basic aspect, it is preferable that the projection area ratio of the projections gradually increase from a central portion of the light incident face toward end portions of the light incident face in a direction parallel to the light incident face.

In the first basic aspect, the projections are preferably formed to satisfy

11<A<15 in case of 220<L<270 where A is the average (%) of the projection area ratios of the projections, and L is the length (mm) of the effective emission region of the light emitting surface in a direction perpendicular to the light incident face.

In the first basic aspect, in case of 220<L<270, letting x be a distance (mm) from an emission start position as a side end of the effective emission region which is nearest to the tubular light source to an arbitrary position outside any projection on a straight line passing through a center of the effective emission region of the light emitting surface and crossing the light incident face at a right angle, and Rx be a projection formation ratio which is a ratio of a total length of bases of all the projections present within a predetermined distance from a start point as a start position of the projection nearest to the position x to an end point as a predetermined position in a direction opposite a light incident face direction to the predetermined distance, the projections are preferably formed to satisfy $S(x)-3<Rx<S(x)+3$ for $S(x)=e^{g(x)}$
wherein e is the base of a natural logarithm, and $g(x)=0.00005(x-11)^2+1.1$, provided that when the end point is outside any projection, a start position of a first projection counted from the end position in the direction opposite the light incident face direction is regarded as an end point, and when the end point is present on a projection, a start position of the projection on which the end point is present is regarded as an end point.

According to the second basic aspect of the present invention, in order to achieve the above object, there is provided a plane light source unit comprising:

a tubular light source; and
a light guide having a light emitting surface and a reflecting surface in addition to a light incident face placed near the tubular light source to receive light emitted from the tubular light source,
wherein the light guide has a plurality of grooves arrayed in the light emitting surface to extend parallel to each other along a longitudinal direction of the tubular light source so as to cause the light incident from the light incident face to emerge from the light emitting surface, and a depth of each of the grooves increases from a central portion to two end portions in the longitudinal direction of the tubular light source.

In the second basic aspect, when a ratio of areas of bottom surfaces of the grooves to a unit area of an effective emission region of the light emitting surface is defined as an opening area ratio, an opening area ratio of the grooves formed in a portion near the tubular light source is preferably different from that of the grooves formed in a portion spaced apart from the tubular light source.

In the second basic aspect, an average of arrangement pitches of the grooves in the effective emission region of the light emitting surface is preferably not more than 200 μm.

The plane light source unit according to the second basic aspect preferably further comprises diffusion means placed near the light emitting surface to guide light emerging from the light emitting surface in a direction perpendicular to the light emitting surface.

The diffusion means preferably controls the emergent light such that a direction of a luminance peak of the light emerging from the diffusion means is set within 30° with respect to a direction perpendicular to the light emitting surface.

The diffusion means preferably has a convergence coefficient of 2 to 4, and a haze of 70 to 95%.

The diffusion means preferably comprises one or two diffusion sheets.

The plane light source unit according to the second aspect preferably further comprises a collimation sheet for collimating the light from the diffusion means.

In the plane light source unit according to the second aspect, the collimation sheet preferably has a plurality of prisms arrayed in a direction substantially coinciding with an array direction of the grooves.

In order to achieve the above object, according to the third basic aspect of the present invention, there is provided a light guide used for a plane light source unit, comprising:

an incident face which is one end face of the light guide and placed near a tubular light source to receive light emitted from the tubular light source;
a reflecting surface which is one major surface of the light guide and substantially perpendicular to the light incident face; and
a light emitting surface which is the other major surface of the light guide on an opposite side to the reflecting surface and substantially perpendicular to the light incident face,
wherein a plurality of projections are arrayed on the light emitting surface to extend parallel to each other along a longitudinal direction of the tubular light source so as to cause the light incident from the light incident face to emerge from the light emitting surface, and a height of each of the projections increases from a central portion to two end portions in the longitudinal direction of the tubular light source.

In order to achieve the above object, according to the fourth basic aspect of the present invention, there is provided a light guide used for a plane light source unit, comprising:

an incident face which is one end face of the light guide and placed near a tubular light source to receive light emitted from the tubular light source;
a reflecting surface which is one major surface of the light guide and substantially perpendicular to the light incident face; and
a light emitting surface which is the other major surface of the light guide on an opposite side to the reflecting surface and substantially perpendicular to the light incident face,
wherein a plurality of grooves are arrayed in the light emitting surface to extend parallel to each other along a longitudinal direction of the tubular light source so as to cause the light incident from the light incident face to emerge from the light emitting surface, and a depth of each of the grooves increases from a central portion to two end portions in the longitudinal direction of the tubular light source.

As described above, in the light guides according to the first and second basic aspects of the present invention, the depth of each groove or the height of each projection increases from the central portion in the longitudinal direction toward the two side portions in the longitudinal direction. With this structure, light emerges from the light emitting surface in an almost uniform amount in the longitudinal direction of each projection or groove, while relieving a bad effect from the non-emitting electrodes of the tubular light source, and hence there is no luminance irregularity in the longitudinal direction. In addition, since these light guides use refraction at the projections or grooves, there are no light absorbing portions like a scattering pattern on a conventional diffusion type light guide, and hence a high-luminance plane light source unit can be obtained.

In addition, since the projection areas of the projections or grooves onto the surface on which the projections or grooves are formed increase with an increase in distance from the light source, the probability that light impinges on the projections or grooves increases with the increase in distance from the light source. A decrease in amount of light reaching the projections or grooves can be compensated.

In the light guide of the present invention, the projection area ratio of the projections increases from the central portion of the light incident face toward the end portions of the light incident face to cause light to emerge in a direction parallel to the light incident face in an almost unique amount, thereby preventing luminance irregularity in the direction parallel to the light incident face.

Further, since the arrangement pitches of the projections or grooves are set to be 200 μm or less, bright and dark fringes are difficult to discriminate with the naked eye. A diffusion sheet can therefore be omitted.

When the length of the effective emission region of the light emitting surface in a direction perpendicular to the light incident face is defined as L (mm), and the average of the projection area ratio of the projections is defined as A (%), luminance irregularity or a decrease in luminance in the effective emission region in a direction perpendicular to the light incident face can be prevented by fixing 15<A<20 in case of 100<L<162 and 11<A<15 in case of 220<L<270.

Further, since the formation ratio Rx of projections is set to satisfy S(x)−5<Rx<S(x)+5 in case of 100<L<162, no luminance irregularity occurs.

Further, since each projection formed on the light guide has no undercut portion, no slide mold is required to manufacture a light guide by a molding method, facilitating a molding process. In addition, since each projection has a prism-like shape, light incident on each projection can be efficiently caused to emerge from the light guide. Furthermore, since each prism is formed on a straight line passing through the center of the effective emission region of the light emitting surface and crossing the light incident face at a right angle to satisfy 3.0>(length of base of prism projection)/(height of prism projection)>1.0, a high-luminance light guide can be easily molded.

The diffusion means provided by the present invention sets the direction of the luminance peak of light emerging from the light emitting surface of the light guide in a direction perpendicular to a surface of a diffusion means so as to prevent luminance irregularity in the form of fringes caused by burrs on the light incident face from being visually recognized. In addition, the diffusion sheet can prevent moire between the prism projections arrayed on the light emitting surface of the light guide and the prisms arrayed on the collimation sheet, and moire between the prism projections arrayed on the light guide and the pixel pitch.

The direction of the luminance peak of light emerging from the diffusion means is controlled within 30° with respect to a direction perpendicular to the surface of the diffusion means so as to direct the luminance peak in the direction in which the plane light source unit is used. Therefore, a decrease in drive voltage to the tubular light source and a reduction in the power consumption of the plane light source unit can be attained.

Since the diffusion means has a convergence coefficient of 2 to 4, light emerging in an oblique direction with respect to the light emitting surface can be further directed toward a direction perpendicular to the light emitting surface, thereby improving the utilization efficiency of light.

Since the diffusion means has a haze of 70 to 95%, good viewing angle characteristics can be obtained owing to the proper diffusion effect of the diffusion sheet.

By using two diffusion sheets, i.e., the first and second diffusion sheets as a diffusion means, the direction of the luminance peak of light emerging from the first diffusion sheet can be further directed toward a direction perpendicular to the light emitting surface, thereby improving the utilization efficiency of light.

Since the collimation sheet for collimating light emerging from the diffusion sheet is placed above the diffusion sheet, moires and luminance irregularity can be prevented, and the utilization efficiency of light can be improved. In addition, the luminance in a direction perpendicular to the light emitting surface can be increased, further improving the utilization efficiency of light.

Since the collimation sheet includes a plurality of prisms arrayed in a direction almost coinciding with the array direction of the projections on the light guide, the luminance in a direction perpendicular to the surface of the collimation sheet increases.

The above and other objects, features, and advantages of the present invention will be apparent to those skilled in the art from the following detailed description of the preferred embodiments in conjunction with the accompanying drawings.

BRIEF DESCRIPTION OF THE DRAWINGS

FIGS. 19A and 19B are views for explaining the formation ratio of projections in the present invention;

FIG. 40 is a plan view showing a contour line plot of front luminances on the plane light source unit using the comparative light guide 223".

DETAILED DESCRIPTION OF THE PREFERRED EMBODIMENTS

Figure 1:
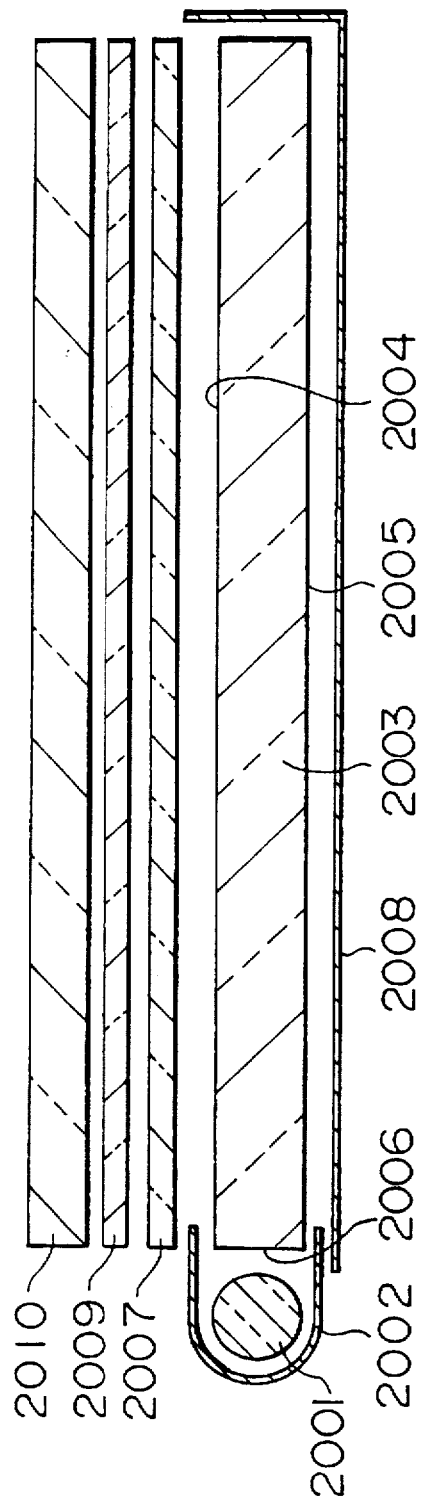
FIG. 1 is a longitudinal sectional view showing the arrangement of the main part of a conventional plane light source unit.
Figure 2:
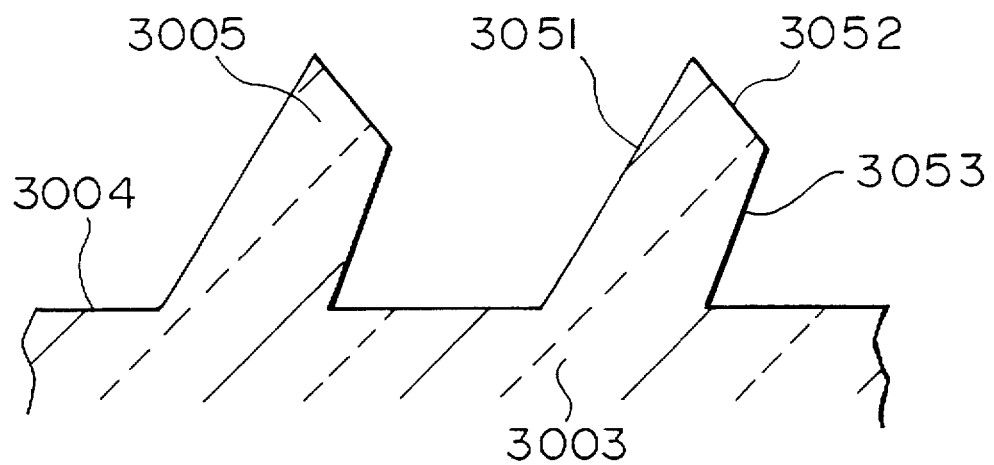
FIG. 2 is a longitudinal sectional view showing the arrangement of the main part of another conventional plane light source unit.

Several preferred embodiments of the present invention will be described below with reference to the accompanying drawings.

The first embodiment of the present invention will be described first with reference to FIGS. 3 to 6. Referring to FIGS. 3 to 6, reference numeral 1 denotes a light guide constituted by a light emitting surface 2, facing a liquid crystal panel 12, and a reflecting surface 3; and 6, a tubular light source placed near a light incident face 4 of the light guide 1. A material having a high transmittance is preferably used for the light guide 1. In consideration of cost, a plastic material such as an acrylic or polycarbonate plastic material is preferable. In consideration of easy molding as well, an acrylic plastic material is more preferable.

Reference numeral 7 denotes a reflecting plate for reflecting light emitted from the tubular light source 6 toward the light guide 1; and 11, a collimation sheet placed on the light emitting surface 2 side of the light guide 1 to collimate light emerging from the light emitting surface 2 toward the front surface, i.e., an observer.

Figure 4:
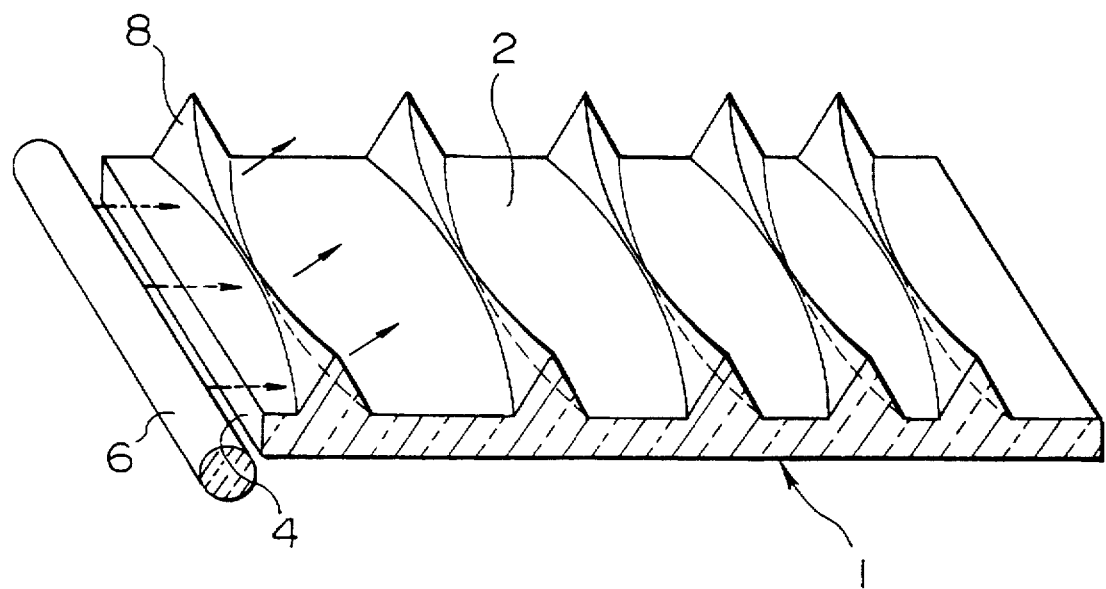
FIG. 4 is a perspective view for explaining the main part of the first embodiment in FIG. 3.

A plurality of projections 8 extending almost parallel to each other along the longitudinal direction of the tubular light source 6 are arrayed on the light emitting surface 2 of the light guide 1. Each projection 8 is constituted by two inclined surfaces, i.e., an inclined projection surface A 9 and an inclined projection surface B 10. In addition, as shown in FIG. 4, each projection 8 is formed such that both side portions in the longitudinal direction thereof are higher than the central portion in the longitudinal direction, and the height gradually increases from the central portion toward both the side portions.

Figure 6:
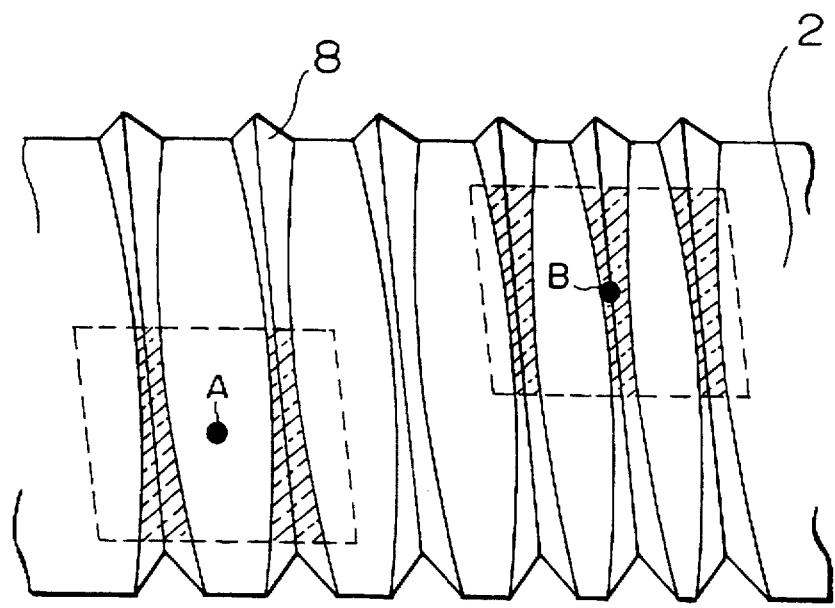
FIG. 6 is a perspective view for explaining the projection area of projections onto a light emitting surface with respect to a unit area of the light emitting surface in FIG. 3.

As shown in FIG. 6, the projection areas of the projections 8 onto the light emitting surface 2 (the areas of portions regarded as the projections 8 when the light emitting surface 2 is viewed from a distant position in a direction perpendicular to the light emitting surface 2, i.e., the areas of the hatched portions in FIG. 6) per unit area (1 mm×1 mm) of the light emitting surface 2, on which the projections 8 are formed, increase with an increase in distance from the tubular light source 6. In addition, the projections 8 are arranged at average pitches of 200 μm or less.

Figure 3:
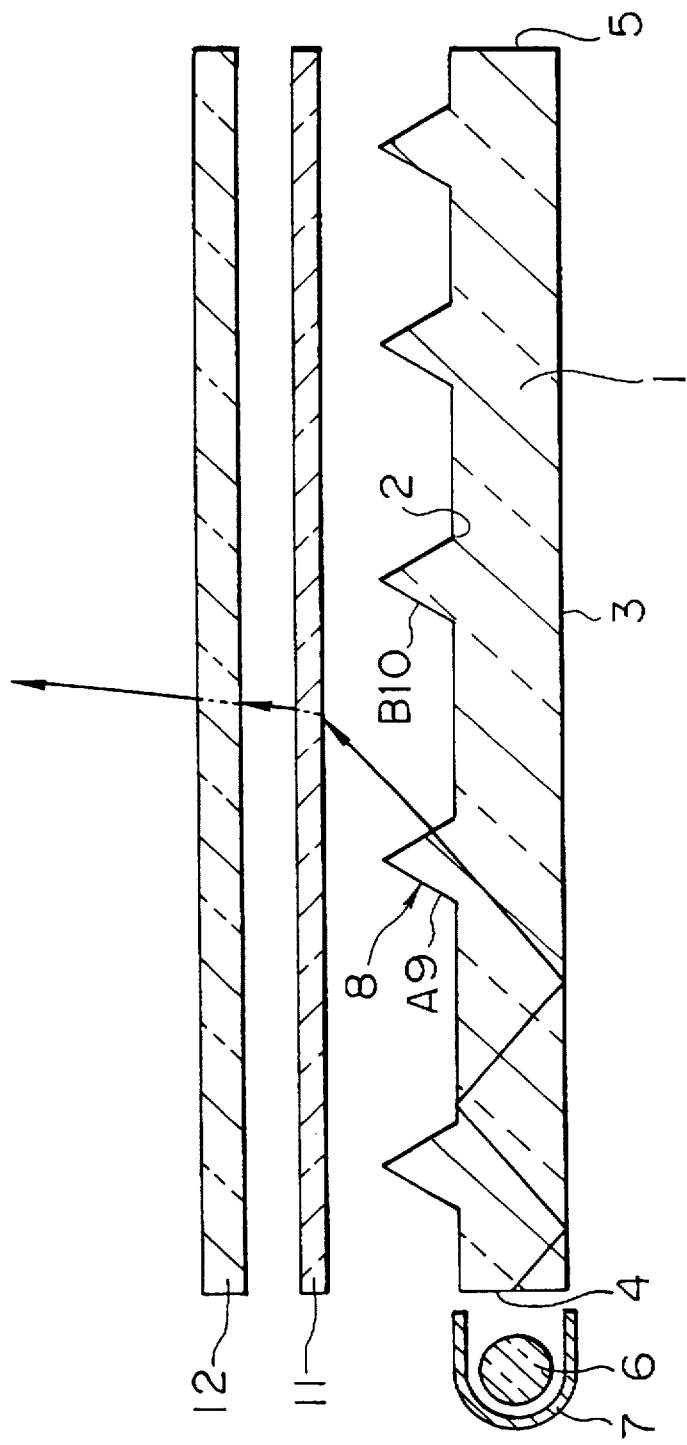
FIG. 3 is a sectional front view of a first embodiment of the present invention.

The operation of the above structure will be described next with reference to FIGS. 3 to 5. Part of light emitted from the tubular light source 6 directly reaches the projections 8, and another part of the light reaches the projections 8 after undergoing total reflection on the reflecting surface 3 and the light emitting surface 2 of the light guide 1 several times.

Figure 5:
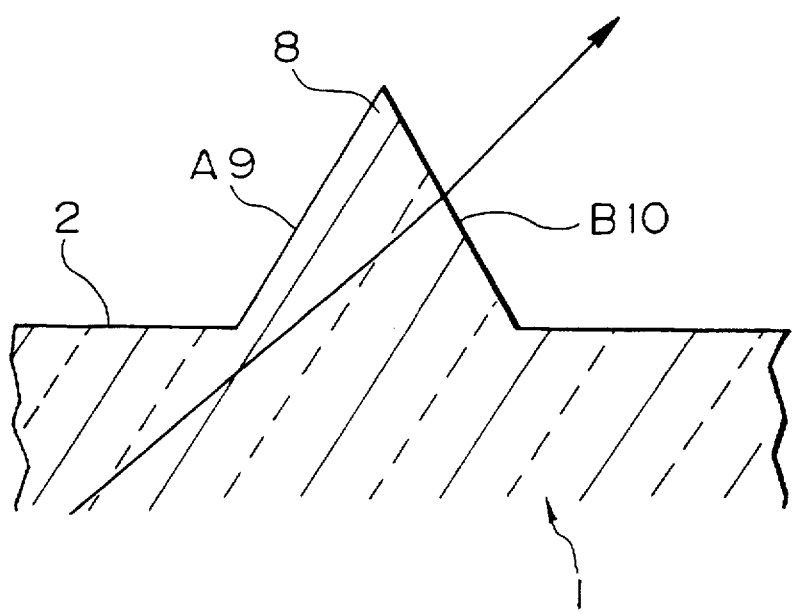
FIG. 5 is an enlarged view of a projection in FIG. 3.

In this case, as shown in FIG. 5, a light beam is refracted by the inclined projection surface A9 or the inclined projection surface B10 and emerges toward the liquid crystal panel 12. The light emerging from the light guide 1 is refracted by the collimation sheet 11 in a direction perpendicular to the liquid crystal panel 12 to illuminate the liquid crystal panel 12.

According to the above structure, although the tubular light source 6 is darker at each side portion in its longitudinal direction than at the central portion in its longitudinal direction, the amount of light emerging from the light emitting surface 2 is almost constant in the longitudinal direction of each projection, and no luminance irregularity occurs in the longitudinal direction, because each side portion of each projection 8 in its longitudinal direction are higher than the central portion in its longitudinal direction, as shown in FIG. 6.

In addition, although the light traveling the inside of the light guide 1 decreases the quantity of light to be reached to the light guide 1 with an increase in distance from the tubular light source 6, the amount of light emerging from the light emitting surface 2 remains almost constant regardless of the distance from the tubular light source 6, because the projection areas of the projections 8 onto the light emitting surface 2 per unit area of the light emitting surface 2 increase with an increase in distance from the tubular light source 6.

Furthermore, since the arrangement average pitches of the projections 8 are set to be 200 μm or less, bright and dark fringes are difficult to discriminate with the naked eye. A diffusion means can therefore be not required.

Moreover, since refraction of light is used to cause light to emerge from the light guide 1 without using any material that absorbs light, e.g., a scattering pattern, the light amount loss is small.

Figure 7:
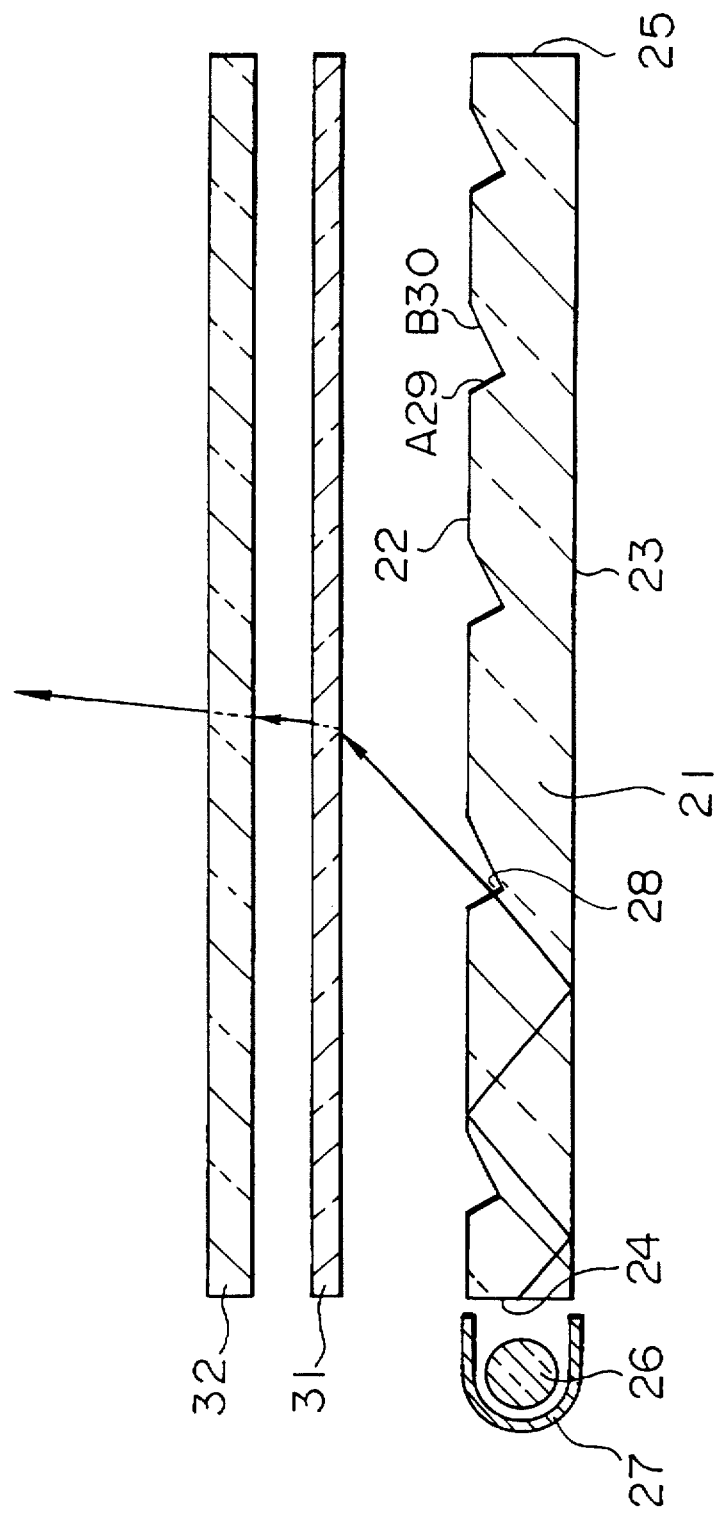
FIG. 7 is a sectional front view of a second embodiment of the present invention.
Figure 8:
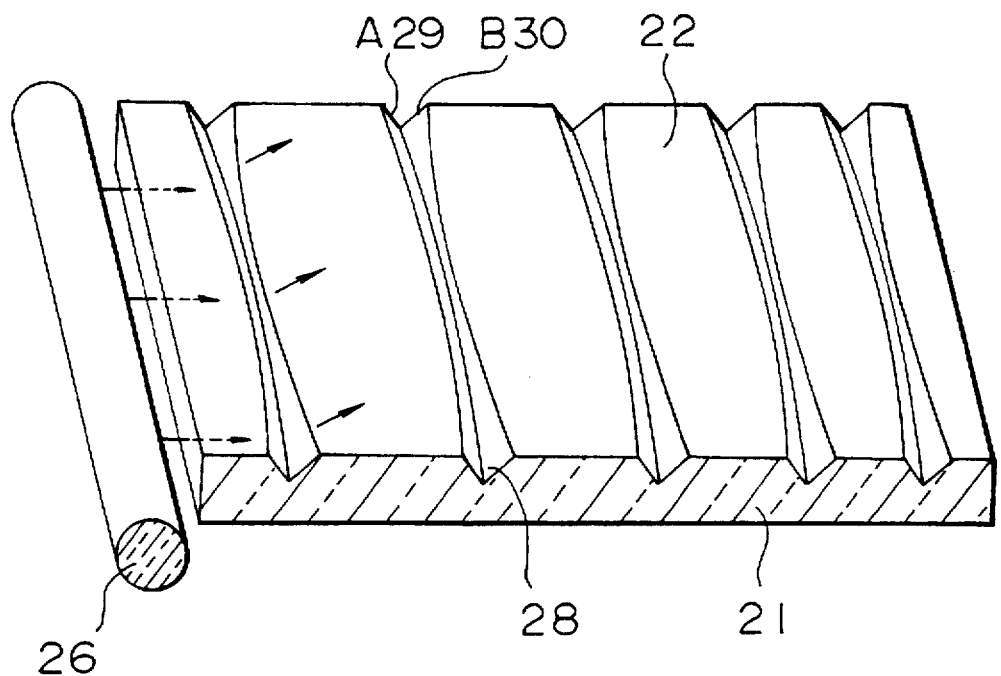
FIG. 8 is a perspective view for explaining the main part of the second embodiment shown in FIG. 7.
Figure 9:
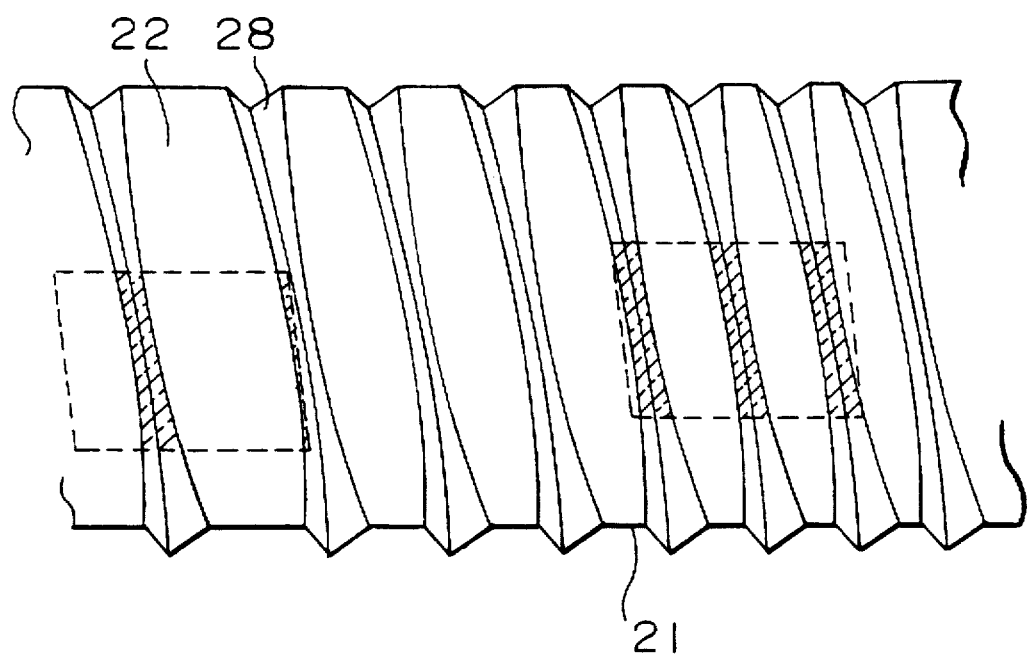
FIG. 9 is a perspective view for explaining the projection area of grooves onto a light emitting surface with respect to a unit area of the light emitting surface in FIG. 7.

The second embodiment of the present invention will be described next with reference to FIGS. 7 to 9. Referring to FIGS. 7 to 9, reference numeral 21 denotes a light guide constituted by a light emitting surface 22, facing a liquid crystal panel 32, and a reflecting surface 23; and 26, a tubular light source placed near a light incident face 24 of the light guide 21. A material having a high transmittance is preferably used for the light guide 1. In consideration of cost, a plastic material such as an acrylic or polycarbonate plastic material is preferable. In consideration of easy molding as well, an acrylic plastic material is more preferable.

Reference numeral 27 denotes a reflecting plate for reflecting light emitted from the tubular light source 26 toward the light guide 21; and 31, a collimation sheet placed on the light emitting surface 22 side of the light guide 21 to collimate light emerging from the light emitting surface 22 in a direction perpendicular to the liquid crystal panel 32, i.e., toward an observer.

A plurality of grooves 28 extending almost parallel to each other along the longitudinal direction of the tubular light source 26 are arrayed in the light emitting surface 22 of the light guide 21. Each groove 28 is constituted by two inclined surfaces, i.e., an inclined groove surface A 29 and an inclined groove surface B30. In addition, as shown in FIG. 8, each groove 28 is formed such that both side portions in the longitudinal direction thereof are deeper than the central portion in the longitudinal direction, and the depth gradually increases from the central portion toward both the side portions.

As shown in FIG. 9, the opening areas of the grooves 28 onto the light emitting surface 22 (the areas of portions regarded as the grooves 28 when the light emitting surface 22 is viewed from a distant position in a direction perpendicular to the light emitting surface 22, i.e., the areas of the hatched portions in FIG. 9) per unit area (1 mm×1 mm) of the light emitting surface 22, in which the grooves 28 are formed, increase with an increase in distance from the tubular light source 26. In addition, the grooves 28 are arranged at average pitches of 200 km or less.

The operation of the above structure will be described next with reference to FIG. 7. Part of light emitted from the tubular light source 26 directly reaches the grooves 28, and another part of the light reaches the grooves 28 after undergoing total reflection on the reflecting surface 23 and the light emitting surface 22 of the light guide 21 several times.

In this case, a light beam is refracted by the inclined groove surface A29 or the inclined groove surface B30 and emerges toward the liquid crystal panel 32. The light emerging from the light guide 21 is refracted by the collimation sheet 31 toward the front surface to illuminate the liquid crystal panel 32.

According to the above structure, although the tubular light source 26 is darker at the two side portions in the longitudinal direction than at the central portion in the longitudinal direction, the amount of light emerging from the light emitting surface 22 is almost constant in the longitudinal direction of each groove, and no luminance irregularity occurs in the longitudinal direction thereof, because both side portions of each groove 28 in the longitudinal direction thereof are deeper than the central portion in the longitudinal direction, as shown in FIG. 9.

In addition, although the light traveling the inside of the light guide 21 decreases the quantity of light to be reached to the light guide 21 with an increase in distance from the tubular light source 26, the amount of light emerging from the light emitting surface 22 remains almost constant regardless of the distance from the tubular light 26, because the opening areas of the grooves 28 onto the light emitting surface 22 per unit area of the light emitting surface 2 increase with the increase in distance from the tubular light source 26.

Furthermore, since the arrangement average pitches of the grooves 28 are set to be 200 μm or less, bright and dark fringes are difficult to discriminate by the naked eye. A diffusion means can therefore be not required.

Moreover, since refraction of light is used to cause light to emerge from the light guide 21 without using any material which can absorb light, e.g., a scattering pattern, the light amount loss is small.

As described above, the formation of grooves or projections on the light emitting surface makes the structure of the plane light source unit simpler, as in the first and second embodiments.

The present invention is not limited to the above embodiments. In each embodiment described above, the height (depth) of each projection (groove) is changed in the longitudinal direction thereof. However, a light guide having projections (grooves) having the same height (depth) as well as projections (grooves) having different heights (depths) may be used. Alternatively, a light guide having grooves and projections together may be used. If a plane light source unit need not have uniform luminance, and, for example, the central portion of an effective emission region 111 (refer to FIG. 10) requires a brighter luminance, it basically suffices to change the depth of each groove or the height of each projection in the longitudinal direction thereof. Furthermore, the side surfaces of the light guide may be surrounded by a reflecting sheet.

The third and fourth embodiments of the present invention will be described next with reference to FIGS. 10 to 16.

Figure 10:
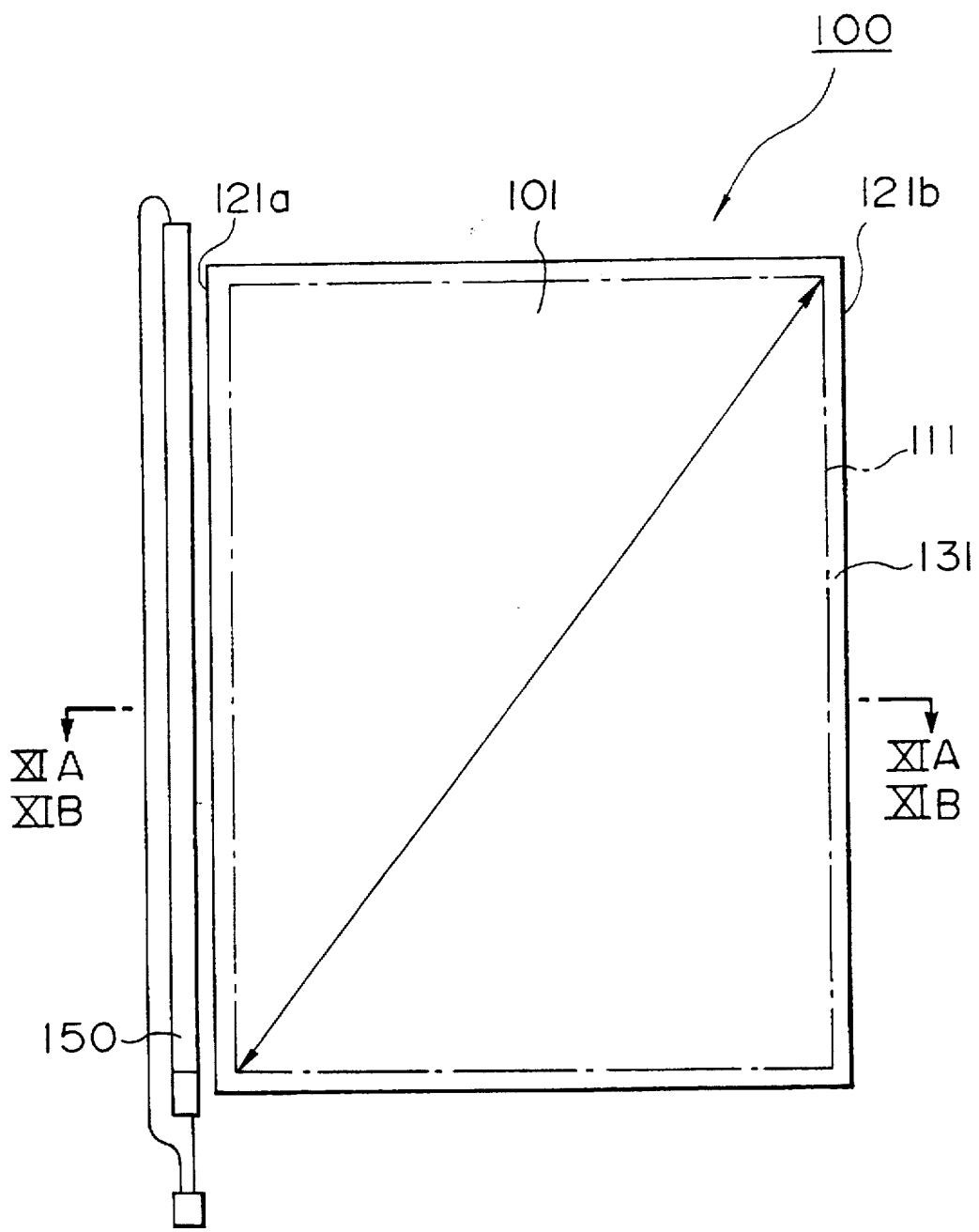
FIG. 10 is a schematic front view of a plane light source unit according to a third or fourth embodiment of the present invention.

As shown in FIG. 10, a plane light source unit 100 of the third or fourth embodiment is a molded product made of an acrylic resin. The plane light source unit 100 comprises a substantially rectangular light guide 101 having the effective emission region 111 having a diagonal length of 10.4 inches, a tubular light source 150 placed near a light incident face 121a formed on one end face of the light guide 101 in the longitudinal direction, a reflecting plate 151 for efficiently guiding light emitted from the tubular light source 150 to the light guide 101, first and second diffusion sheets 160 and 170 placed in substantially horizontal above a light emitting surface 131 of the light guide 101, and a collimation sheet 180 placed in substantially horizontal above the second diffusion sheet 170.

Figure 11A:
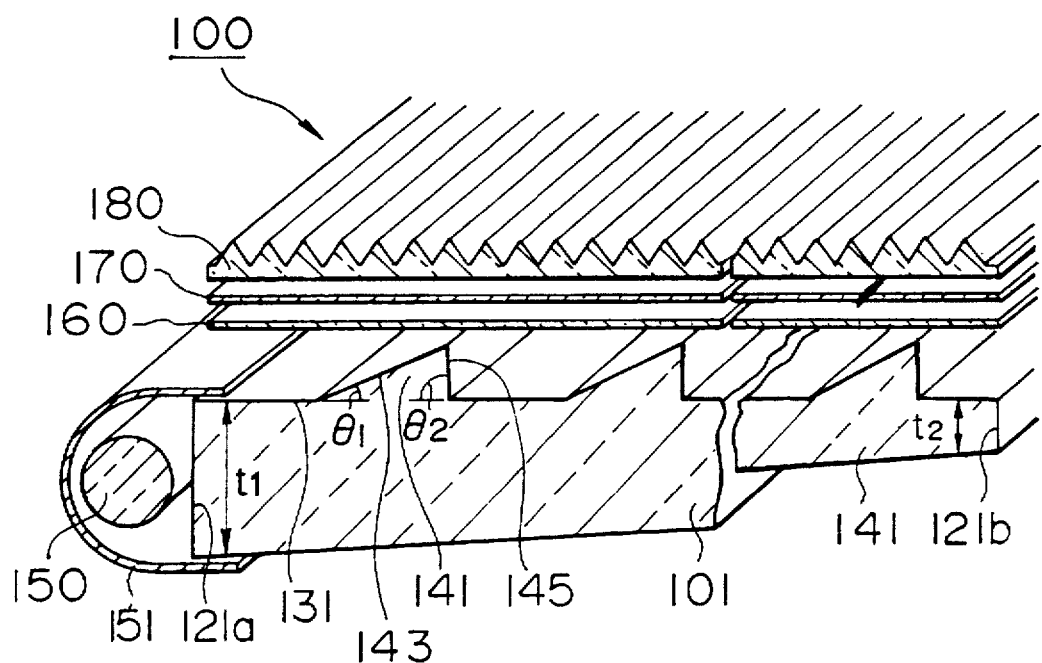
FIGS. 11A and 11B are sectional views respectively taken along a line XIA—XIA and a line XIB—XIB of the plane light source unit in FIG. 10.
Figure 11B:
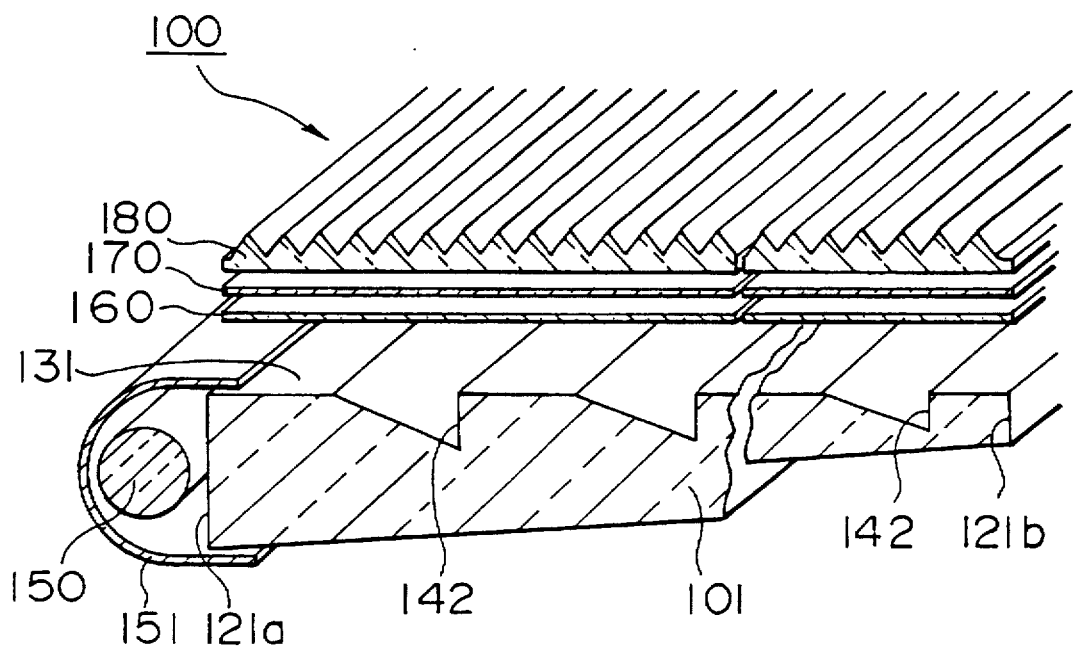

As shown in FIG. 11A or 11B, in order to realize a low-profile unit, this light guide 101 has a wedge-like shape with the light incident face 121a having a thickness t1 of 3 mm, and an end face 121b opposing the light incident face 121a and having a thickness t2 of 1 mm. A plurality of projections or grooves 141 extending almost parallel to each other along the longitudinal direction of the tubular light source 150 are arrayed on the light emitting surface 131 of the light guide 101. A projection in FIG. 11A will be described below.

A projection 141 having a prism shape includes a first inclined surface 143 inclined toward the tubular light source 150, and a second inclined surface 145 crossing the first inclined surface 143. The first inclined surface 143 crosses the light emitting surface 131 of the light guide 101 at an angle $\theta 1$. The second inclined surface 145 crosses the light emitting surface 131 of the light guide 101 at an angle $\theta 2$.

In addition, the pitches of the prism projections 141 gradually decrease with an increase in distance from the tubular light source 150 to attain uniform luminance.

In the third or fourth embodiment, the angel $\theta 1$ defined by the first inclined surface 143 and the light emitting surface 131 of the light guide 101 is set to 27°, and the angel $\theta 2$ defined by the second inclined surface 145 and the major surface 131 of the light guide 101 is set to 88°. Although the angle $\theta 1$ is set to 27° in this case, the angel $\theta 1$ is not limited to this and may be set to any value as long as light emitted from the light source which is incident on the light incident face 121a and propagates in the light guide 101 is totally reflected by the second inclined surface 145 of the prism projection 141 to be guided. If, however, the angel $\theta 1$ is excessively small, a large number of prism projections 141 cannot be arranged, resulting in luminance irregularity. For this reason, the angel $\theta 1$ is preferably set within the range of 20° to 40°. In addition, the angel $\theta 2$ is set to about 90° in this case. However, in order to reduce the spread of emergent light, this angle is preferably set to 80° or more, and may be set to an obtuse angle of 90° or more.

For example, the diffusion sheet "DF-100" (available from Fuji Photo Film Co., Ltd.) having a total light transmittance of 80%, a haze of 90%, and a convergence coefficient of 2.5 is used as each of the first and second diffusion sheets 160 and 170. Note that the convergence coefficient of the diffusion sheet indicates the ratio (Q1/Q2) of a peak luminance Q1 to a minimum luminance Q2 within the range of −80° to +80° which are defined by uniformly diffused light and a direction perpendicular to the diffusion sheet surface.

As the collimation sheet 180, the prism sheet "BEFII" (available from Sumitomo 3M Limited) having an array of isosceles prisms each having a vertical angle of 90°. The prism array direction almost coincides with the projection 141 direction of the light guide 101. When the collimation sheet 180 is to be used for a liquid crystal display device or the like, the prism array direction may be slightly inclined with respect to the pixel array direction in the display device in consideration of interference with the display device. For example, the prism array direction of the collimation sheet 180 may be inclined at an angle of several degrees with respect to the array direction of the projection 141 of the light guide 101.

The operation of the plane light source unit 100 will be described next.

Figure 12:
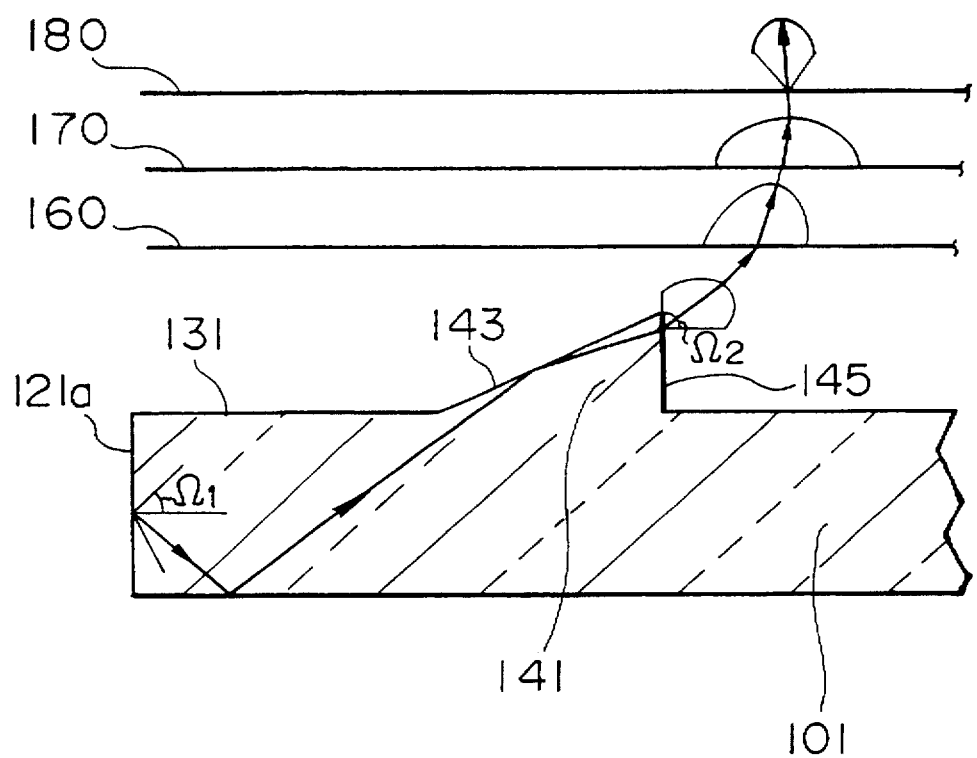
FIG. 12 is a view for explaining the operation of the plane light source unit in FIG. 10.

Light emitted from the tubular light source 150 enters the light guide 101 as light having a convergent angle $\Omega 1$ of about 42° with respect to the light emitting surface owing to the difference in refractive index between air and the acrylic resin, as shown in FIG. 12.

When, for example, light propagating in the light guide 101 is guided to the first inclined surface 143 of the prism projection 141, the light is totally reflected by the first inclined surface 143 and guided to the second inclined surface 145. The light is then converged at a convergent angle $\Omega 2$ of about 90° with respect to the light emitting surface 131 of the light guide 101 by the second inclined surface 145, and emerges as an emerging light having directivity from the light guide 101. Similarly, for example, when light emitted from the light source and propagating in the light guide 101 is guided directly to the second inclined surface 145 of the prism projection 141, the light is converged at the convergent angle $\Omega 2$ of about 90° with respect to the light emitting surface 131 of the light guide 101 by the second inclined surface 145, and emerges as light having directivity from the light guide 101.

Figure 13:
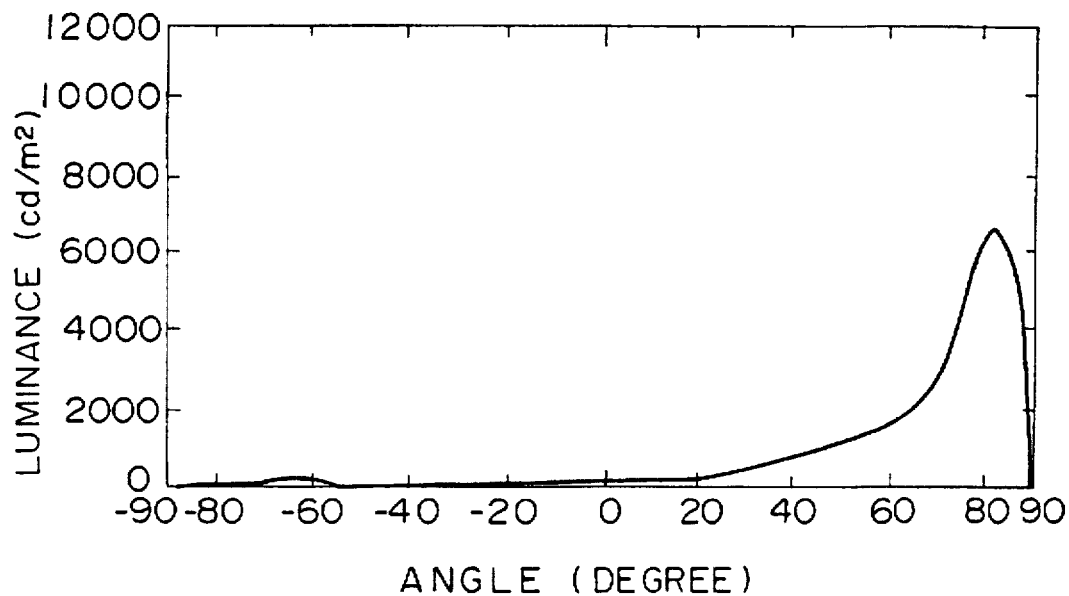
FIG. 13 is a graph showing a viewing angle characteristic of light emerging from the light guide of the plane light source unit in FIG. 10, wherein the abscissa indicates the angle defined between a direction perpendicular to the central portion of the light emitting surface of the light guide and a measurement direction, and the ordinate indicates the luminance.

FIG. 13 is a graph showing a viewing angle characteristic of light emerging from the light guide 101, wherein the abscissa indicates the angle defined between a direction perpendicular to the central portion of the light emitting surface 131 of the light guide 101 and a measurement direction (perpendicular to the tubular light source 150) almost parallel to the light emitting surface, and the ordinate indicates the luminance (cd/m$^2$). As is apparent from FIG. 15, light having a sufficient directivity emerges from the light guide 101 with high efficiency.

Light emerges with directivity from the light guide 101 in this manner is diffused by the first diffusion sheet 160, and the direction of the luminance peak is shifted in a direction perpendicular to a surface of the first diffusion sheet 160.

Figure 14:
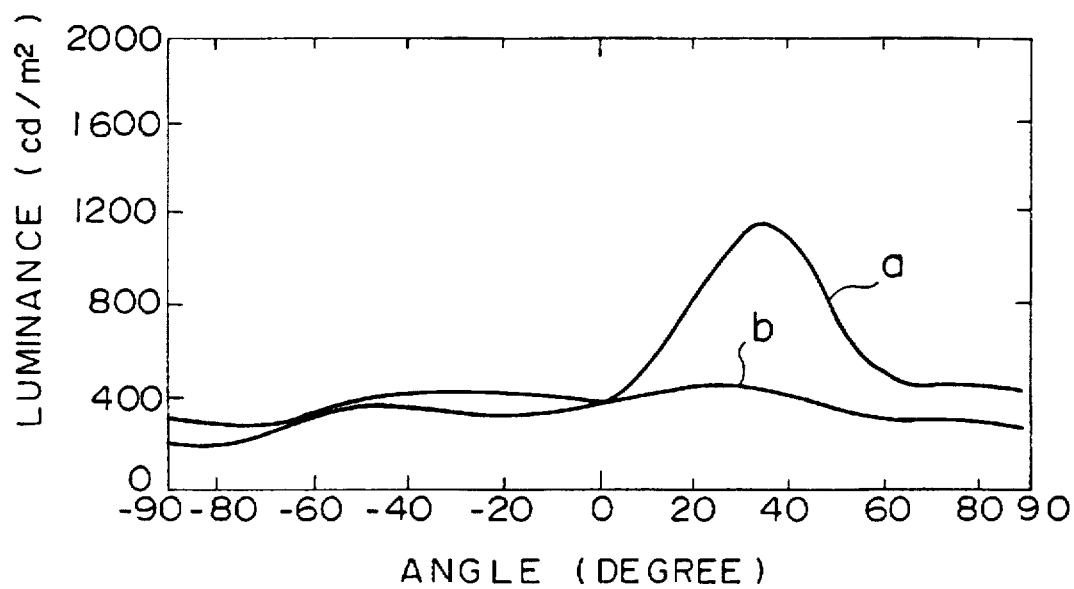
FIG. 14 is a graph showing a viewing angle characteristic of light emerging from the first diffusion sheet of the plane light source unit in FIG. 10, wherein the abscissa indicates the angle defined between a direction perpendicular to the central portion of the surface of the first diffusion sheet and a measurement direction, and the ordinates indicates the luminance.

FIG. 14 is a graph showing a viewing angle characteristic of light emerging from the first diffusion sheet 160, wherein the abscissa indicates the angle defined between a direction perpendicular to the central portion of the surface of the first diffusion sheet 160 and a measurement direction, and the ordinates indicates the luminance (cd/m$^2$). In FIG. 14, a curve a is obtained by measurement in a direction perpendicular to the light incident face 121a, shown in FIG. 12, and a curve b is obtained by measurement in a direction parallel to the light incident face 121a. As is apparent from FIG. 14, the light is shifted by the first diffusion sheet 160 in a direction perpendicular to the light emitting surface 131 of the light guide 101 while the directivity coefficient is maintained.

Furthermore, the luminance peak of light emerging from the first diffusion sheet 160 is shifted in a direction perpendicular to the surface of the second diffusion sheet 170 while the light is diffused by the second diffusion sheet 170.

Figure 15:
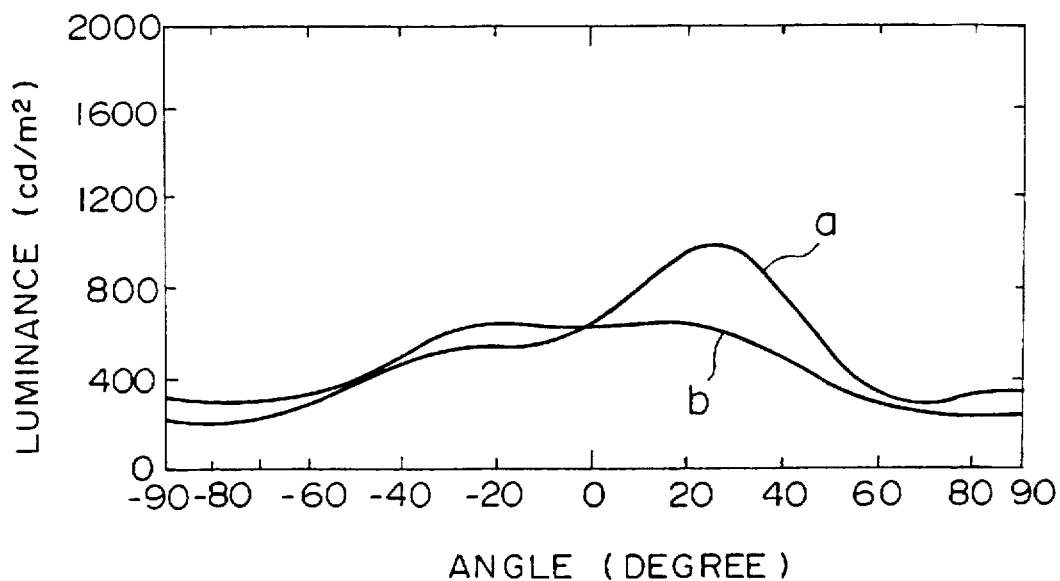
FIG. 15 is a graph showing a viewing angle characteristic of light emerging from the second diffusion sheet of the plane light source unit in FIG. 10, wherein the abscissa indicates the angle defined between a direction perpendicular to the central portion of the surface of the second diffusion sheet and a measurement direction, and the ordinates indicates the luminance.
Figure 17:
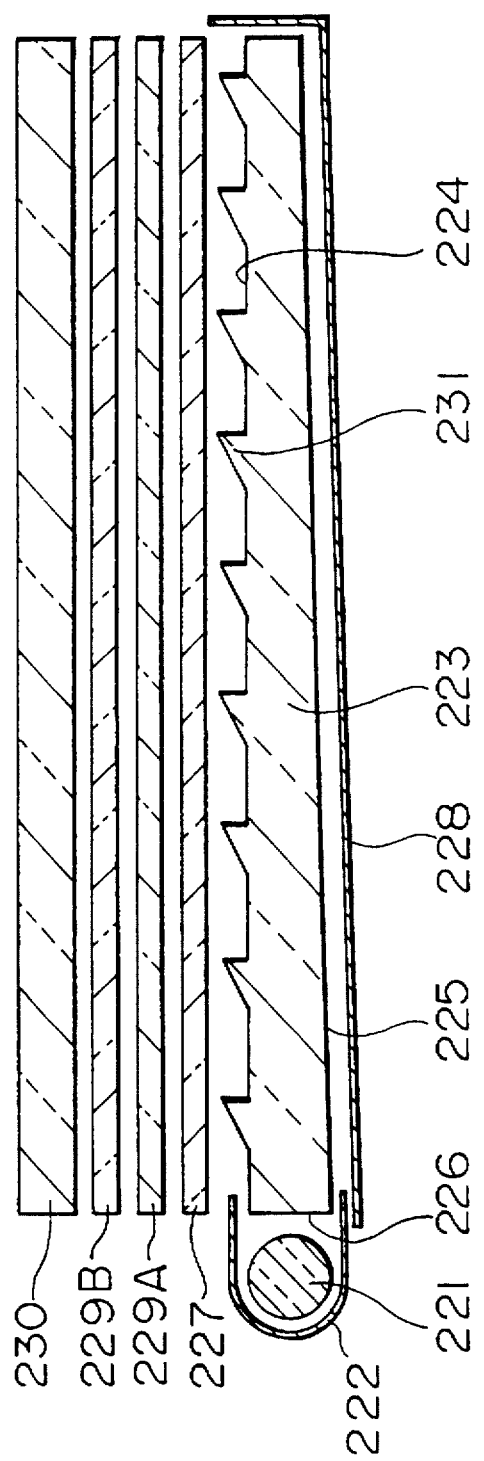
FIG. 17 is a sectional view showing the structure of a plane light source unit using a light guide according to a fifth embodiment of the present invention.

FIG. 15 is a graph showing a viewing angle characteristic of light emerging from the second diffusion sheet 170, wherein the abscissa indicates the angle defined between a direction perpendicular to the central portion of the surface of the second diffusion sheet 170 and a measurement direction, and the ordinate indicates the luminance (cd/m$^2$). In FIG. 17, a curve a is obtained by measurement in a direction perpendicular to the light incident face 121a, and a curve b is obtained by measurement in a direction parallel to the light incident face 121a. As is apparent from FIG. 15, the luminance peak of the light is controlled by the second diffusion sheet 170 within 30° with respect to a direction perpendicular to the surface of the second diffusion sheet 170.

Light emerging the second diffusion sheet 170 is collimated by the collimation sheet 180, while the luminance peak is shifted in a direction perpendicular to the surface of the collimation sheet 180.

Figure 16:
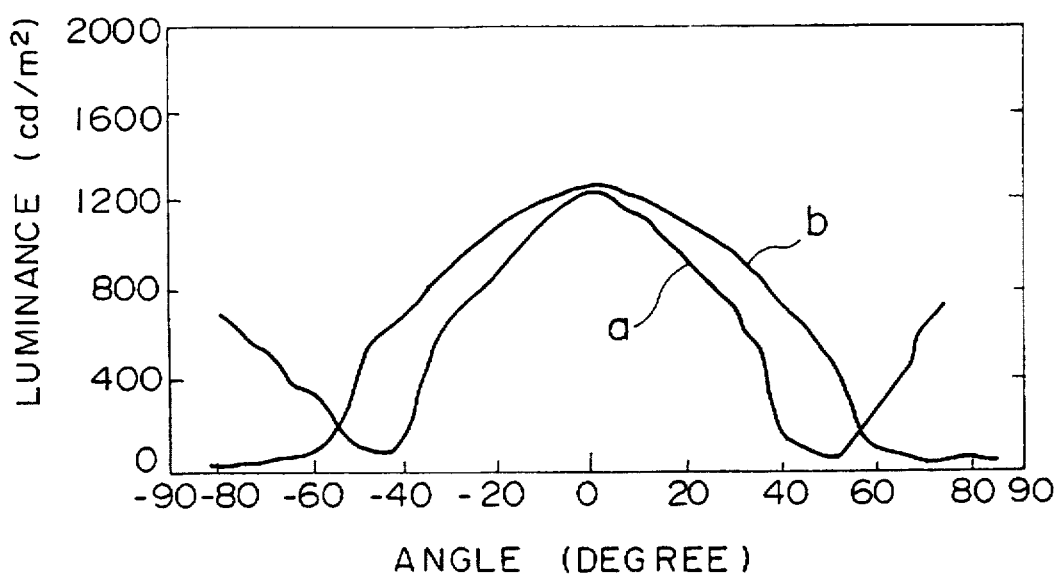
FIG. 16 is a graph showing a viewing angle characteristic of light emerging from the collimation sheet of the plane light source unit in FIG. 10, wherein the abscissa indicates the angle defined between a direction perpendicular to the central portion of the surface of the collimation sheet and a measurement direction, and the ordinates indicating the luminance.
Figure 18:
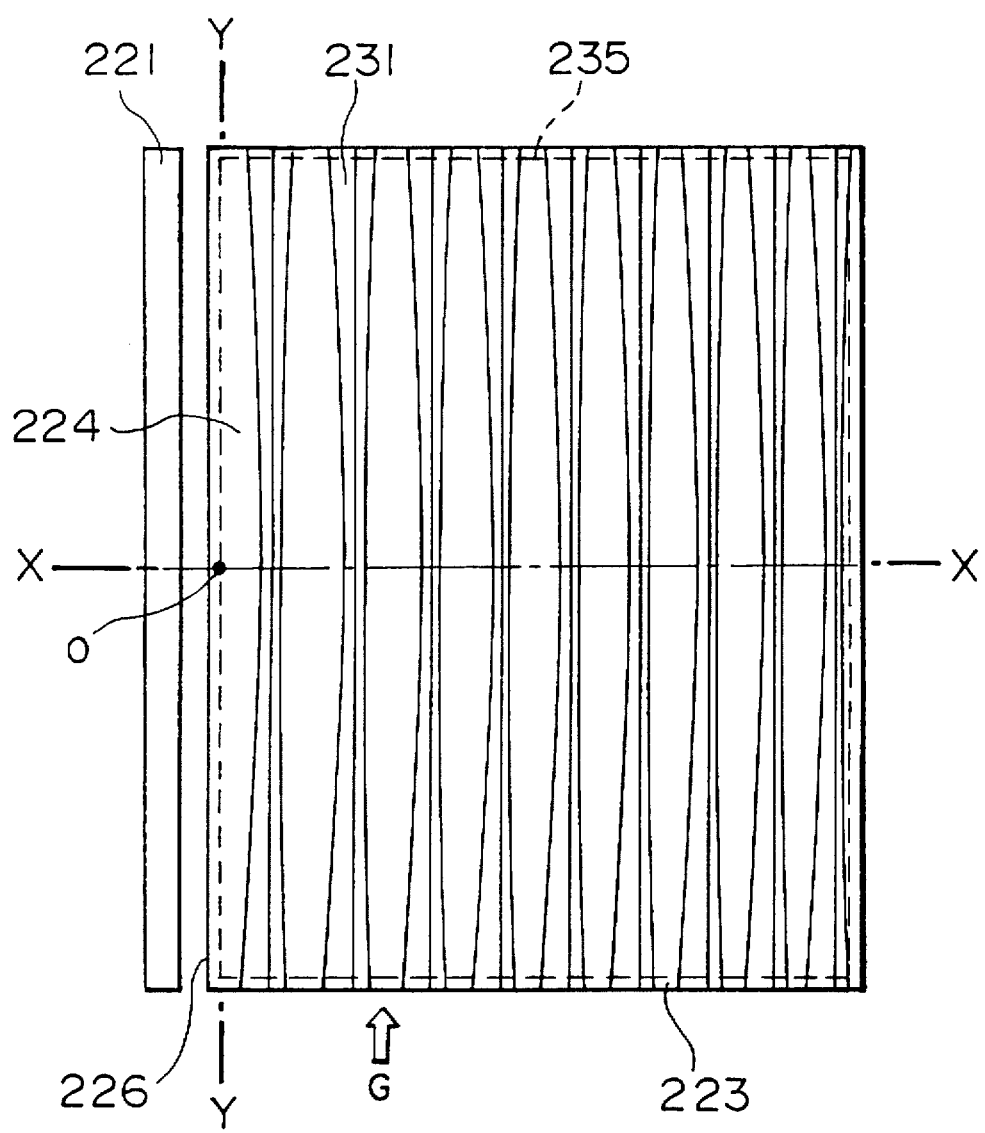
FIG. 18 is a plan view showing the plane light source unit in FIG. 17 from which a diffusion sheet, a collimation sheet, and a liquid crystal panel are omitted.

FIG. 16 is a graph showing a viewing angle characteristic of light emerging from the collimation sheet 180, wherein the abscissa indicates the angle defined between a direction perpendicular to the light emitting surface 131 in the center of the surface of the collimation sheet 180 and a measurement direction, and ordinate indicates the luminance (cd/m$^2$). In FIG. 18, a curve a obtained by measurement in a direction perpendicular to the light incident face 121a, and a curve b is obtained by measurement in a direction parallel to the light incident face 121a. As is apparent from FIG. 16, the light is collimated by the collimation sheet 180, while the luminance peak is made to almost coincide with a direction perpendicular to the surface of the collimation sheet 180.

According to the plane light source unit 100 of the third or fourth embodiment, since the light guide 101 substantially uses only reflection and refraction in the above manner, the utilization efficiency of light from the tubular light source 150 is very high. As is apparent from FIG. 16, therefore, in this embodiment, the central luminance peak of light is set to as high as 1,300 cd/m$^2$ in contrast to, e.g., a plane light source unit having a combination of diffusion and collimation sheets, like those described above, arranged above the major surface of the diffusion type light guide having a scattering pattern printed on its rear surface, in which the central luminance peak of light is 1,100 cd/m$^2$ even with the number of diffusion sheets being decreased to one.

In the third or fourth embodiment, as described above, light emerging from the light guide 101 is guided to the collimation sheet 180 immediately after the light passes through the first and second diffusion sheets 160 and 170. For this reason, even if undesired light enters the light guide 101 because of burrs and the like on end portions of the light incident face 121a of the light guide 101, since light emerging from the light guide 101 is immediately diffused through the first and second diffusion sheets 160 and 170, luminance irregularity in the form of fringes can be sufficiently eliminated. For example, luminance irregularity in the form fringes was visually recognized in a plane light source unit obtained by stacking the light guide 101, the collimation sheet 180, and the first and second diffusion sheets 160 and 170 in the order named. However, in third or fourth embodiment, no luminance irregularity in the form of fringes was visually recognized.

If this plane light source unit 100 is used for a liquid crystal display device or the like, since the diffusion sheets 160 and 170 are interposed between the liquid crystal panel and the light guide 101, no moiré patterns are generated by the interference between the projection 141 pitch of the light guide 101 and the pixel pitch of the display device.

In addition, as is also apparent from FIG. 16, since light emerging from the plane light source unit 100 does not have the directivity, no deterioration in viewing angle characteristic occurs when the plane light source unit 100 is used for a liquid crystal display device.

In the third or fourth embodiment, the diffusion sheet "DF-100" (available from Fuji Photo Film Co., Ltd.) is used as each of the first and second diffusion sheets 160 and 170. However, other sheets, e.g., the diffusion sheet "D119" (available from Tsujimoto Denki Co., Ltd.) can be suitably used. These diffusion sheets preferably have high total light transmittances, e.g., 80% or more, to prevent a deterioration in the utilization efficiency of light. In addition, the diffusion sheets preferably have appropriate diffusion effects, and the hazes of the sheets are preferably 70% or more and less than 95% to reduce luminance irregularity. Assume that the haze becomes 95% or more. In this case, even if the luminance peak is directed toward a direction perpendicular to the diffusion sheet surface, the luminance value in the same direction decreases because of an excessive diffusion effect. Furthermore, the diffusion sheets preferably have appropriate converging effects, and the convergence coefficients are preferably two or more and less than four. If the convergence coefficient of a diffusion sheet is less than two, it is difficult to direct emergent light in a direction perpendicular to the diffusion sheet surface. If the convergence coefficient is four or more, the viewing angle characteristic deteriorates because of an excessive converging effect.

The third or fourth embodiment uses a combination of the first and second diffusion sheets 160 and 170. However, only one sheet may be used as long as the angle defined by the luminance peak of light emerging from the light guide and a direction perpendicular to the light emitting surface 131 of the light guide 101 is controlled within 30°.

In the third or fourth embodiment, as the collimation sheet 180, the prism sheet "BEFII" (available from Sumitomo 3M Limited) having an array of isosceles prisms each having a vertical angle of 90° is used. However, in accordance with required directivity, the prism sheet "V7" (available from DAI NIPPON PRINTING CO., LTD.), the prism sheet "H210" (available from Mitsubishi Rayon Co., Ltd.), the wave sheet "W518" (available from Sekisui Chemical Co., LTD.), or the like is properly used as the collimation sheet 180.

In addition, in the third or fourth embodiment, the acrylic resin plate is used as the light guide 101. However, other materials may be used. In this case, since the convergent angle of light incident from the light incident face 121a slightly varies, the angle of each projection may be properly changed in consideration of the above situation.

Furthermore, in the third or fourth embodiment, one end face 121a of the light guide 101 is used as the light incident face. However, for example, a groove or through hole including a light incident face may be formed in the light guide 101, and the tubular light source 150 may be placed in the groove.

The fifth embodiment of the present invention will be described next with reference to FIGS. 17 to 30.

FIG. 17 is a sectional view schematically showing the structure of the main part of a plane light source unit using a light guide having a 10.4-inch effective emission region in its diagonal length and providing a length of the tubular light source at a longitudinal side of the effective emission region according to the fifth embodiment of the present invention. FIG. 18 is a plan view of the plane light source unit in FIG. 17 from which a diffusion sheet 227, collimation sheets 229A and 229B, and a liquid crystal panel 230 are omitted. Referring to FIGS. 17 and 18, reference numeral 221 denotes a tubular light source; 222, a reflecting plate for reflecting light from the tubular light source 221 to the right in the drawing; and 223, a light guide in which light from the tubular light source 221 propagates. A surface of the light guide 223 which opposes the liquid crystal panel 230 is defined as a light emitting surface 224; a surface of the plate which opposes the light emitting surface 224, as a reflecting surface 225; and a surface of the plate on which light from the tubular light source 221 is incident, as a light incident face 226. A diffusion sheet 227 is placed above the light emitting surface 224. A reflecting sheet 228 is placed below the reflecting surface 225.

A liquid crystal panel 230 is placed above the diffusion sheet 227 via the collimation sheets 229A and 229B.

A plurality of projections 231 extending almost parallel to the light incident face 226 of the light guide 223 are formed on the light emitting surface 224 of the light guide 223 at intervals. The cross-sectional shape of each projection 231 which is perpendicular to the light incident face 226 is in the form of a prism. Note that the numbers of diffusion sheets and collimation sheets are not limited to those in FIGS. 17 and 18.

Referring to FIG. 18, the region surrounded by the dotted line is an effective emission region 235, above which the liquid crystal region of a liquid crystal panel 230 is placed.

In the fifth embodiment, the lengths of the long and short sides of the effective emission region 235 of the light guide 223 are respectively 121 mm and 160 mm, and the light guide 223 has a wedge-like shape with the light incident face 226 having a height of 3 mm, and the opposing face having a height of 1 mm. The tubular light source 221 is placed to be parallel to the long sides of the effective emission region 235.

The light guide 223 is manufactured by a resin molding method using a mold. A gate G through which a resin is injected into the mold is formed in a side surface of the light guide 223 which is near the light incident face.

Consider a formation ratio Rx of the projections 231 on a straight line X—X passing through the center of the effective emission region 235 and crossing the light incident face 226 at a right angle.

As shown in FIG. 19A, let x be a point spaced apart from an emission start position O by a distance x (mm), S be the start point of the projection 231 nearest to the point x, and KE be a temporary end point spaced apart from the start point S by 1 mm. When the temporary end point KE is outside any of the projections 231, the percentage of the bases of the projections 231 between the start point S and the temporary end point KE is defined as the formation ration Rx.

Referring to FIG. 19A, since three projections are present between the start point and the end point, $$Rx=\{(L1+L2+L3)/(\text{distance between start point } S \text{ and end point } E)\}\times 100$$

As shown in FIG. 19B, when the temporary end point KE is present on the projection 231, the start position of the projection 231 is defined as the end point E, and the percentage of the bases of the projections 231 between the start point S and the end point E is defined as the formation ration Rx.

Referring to FIG. 19B, since three projections are present between the start point and the end point, $$Rx=\{(L1+L2+L3)/(\text{distance between start point } S \text{ and end point } E)\}\times 100$$

In addition, in the fifth embodiment, a line Y—Y is defined as a line passing through an origin 0 of the line X—X and crossing the line X—X at a right angle.

Let Ln be the length of the base of a projection 331 on a straight line passing through the center of an effective emission region 335 and crossing a light incident face 326 at a right angle. In this case, when n projections are present between the start point S and the end point E, the formation ratio Rx is defined by the following formula (1);

$$R_x = \frac{\sum_{i=1}^{n} L_i \times 100}{(\text{distance between start point and end point})} \quad (1)$$

A projection 231 was formed at an arbitrary position x on the light guide 223 to satisfy:

$$S(x)-5<Rx<S(x)+5$$

where $S(x)=e^{f(x)}$, $f(x)=0.00005(x+65)^2+1.3$, e is the base of a natural logarithm, $S(x)=5$ when $S(x)<5$, and $S(x)=95$ when $S(x)>95$.

A form Talysurf-120L available from Taylor-Hobson was used to measure the width of the base of the projection 231 formed on the light guide 223. More specifically, the stylus of the measurement instrument was moved in a direction perpendicular to the light incident face of the light guide 223, and the width of the base of the projection o the light guide was calculated on the basis of the vertical movement of the stylus.

Calculation of the area rate of the projection 231 is conducted, e.g., by taking a microscopic photograph of the light guide 223 from the perpendicular direction to the light emitting surface 224 thereof, and then measuring a total area of the base of the projections 231 per unit area.

Figure 20:
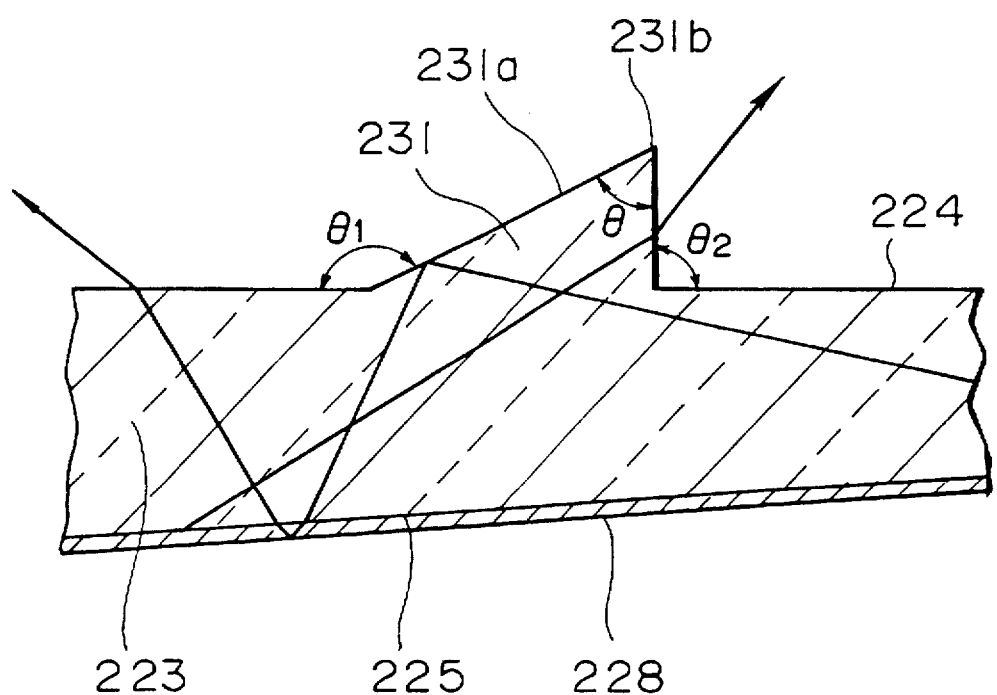
FIG. 20 is an enlarged view of a projection in FIG. 17.

FIG. 20 is an enlarged view of the projection 231. A prism vertical angle θ of the projection 231 is set to 65°; an angel θ1 (the inclination angle of the projection on the light source side) between an inclined projection surface 231a on the light source side and the light emitting surface 224, 153°; and an angel θ2 (the inclination angle of the projection on the opposite side to the light source) between an inclined projection surface 231b on the opposite side to the light source and the light emitting surface 224, 92°.

Consider one projection 231. The projection 231 is symmetrical about a straight line Y=0 (line X—X) in the longitudinal direction of the effective emission region 235, and the height of the projection 231 changes in the longitudinal direction (Y-axis direction) of the tubular light source 221.

Figure 21:
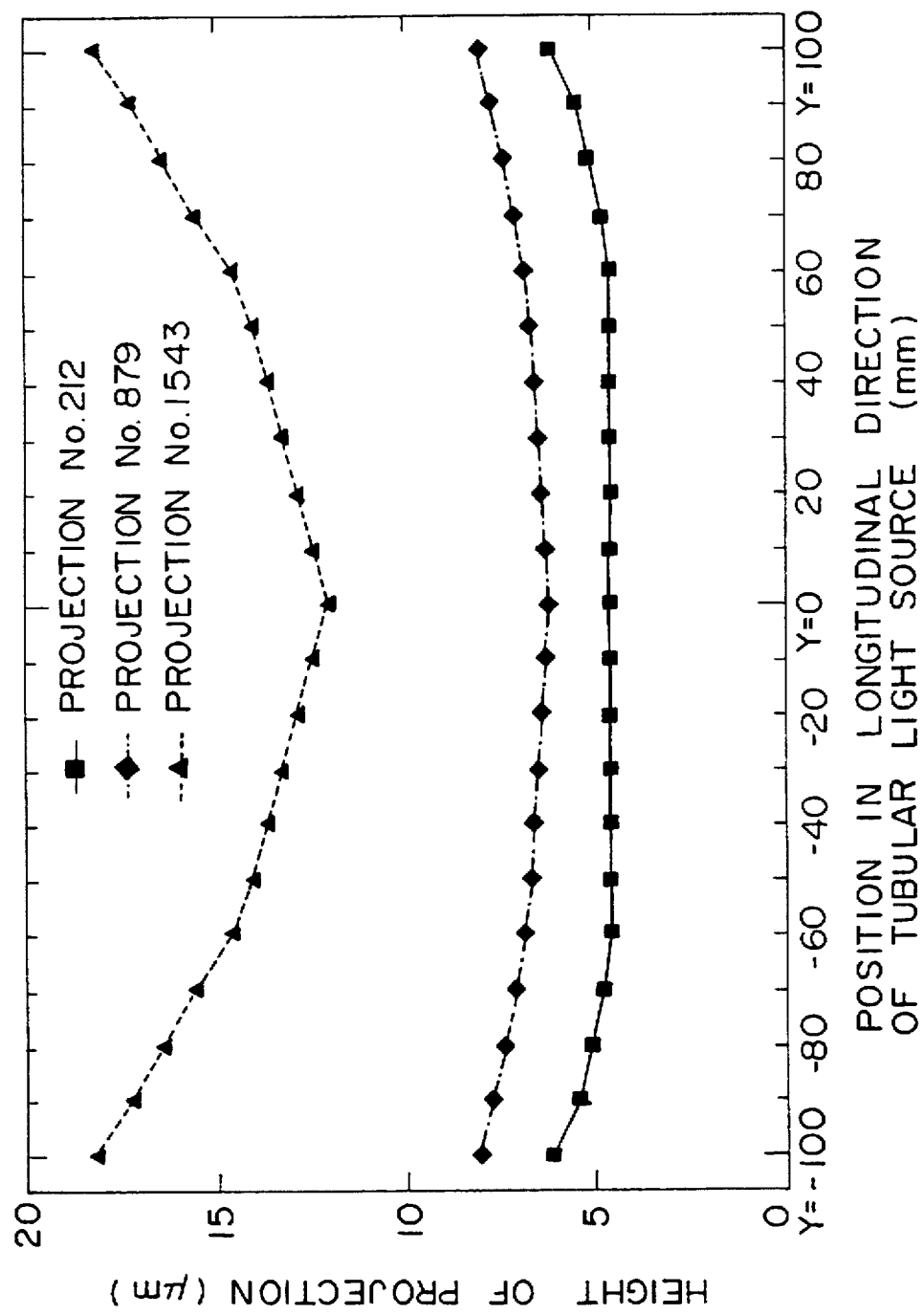
FIG. 21 is a graph for explaining changes in the heights of projections in FIG. 17.

FIG. 21 shows the design values of the heights of typical projections 231 (a projection near the tubular light source 221, a projection near the center, and a projection spaced apart from the tubular light source 221) of the projections 231 formed on the light guide 223 in the fifth embodiment. Each projection No. indicates a projection number counted from the light incident face 226 side.

Figure 22:
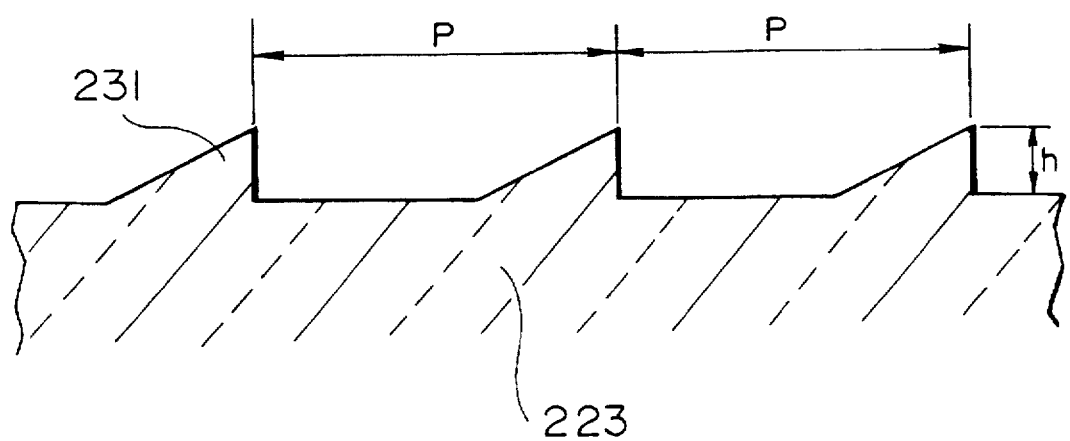
FIG. 22 is a partial sectional view for explaining the pitches and heights of projections in FIG. 17.
Figure 23:
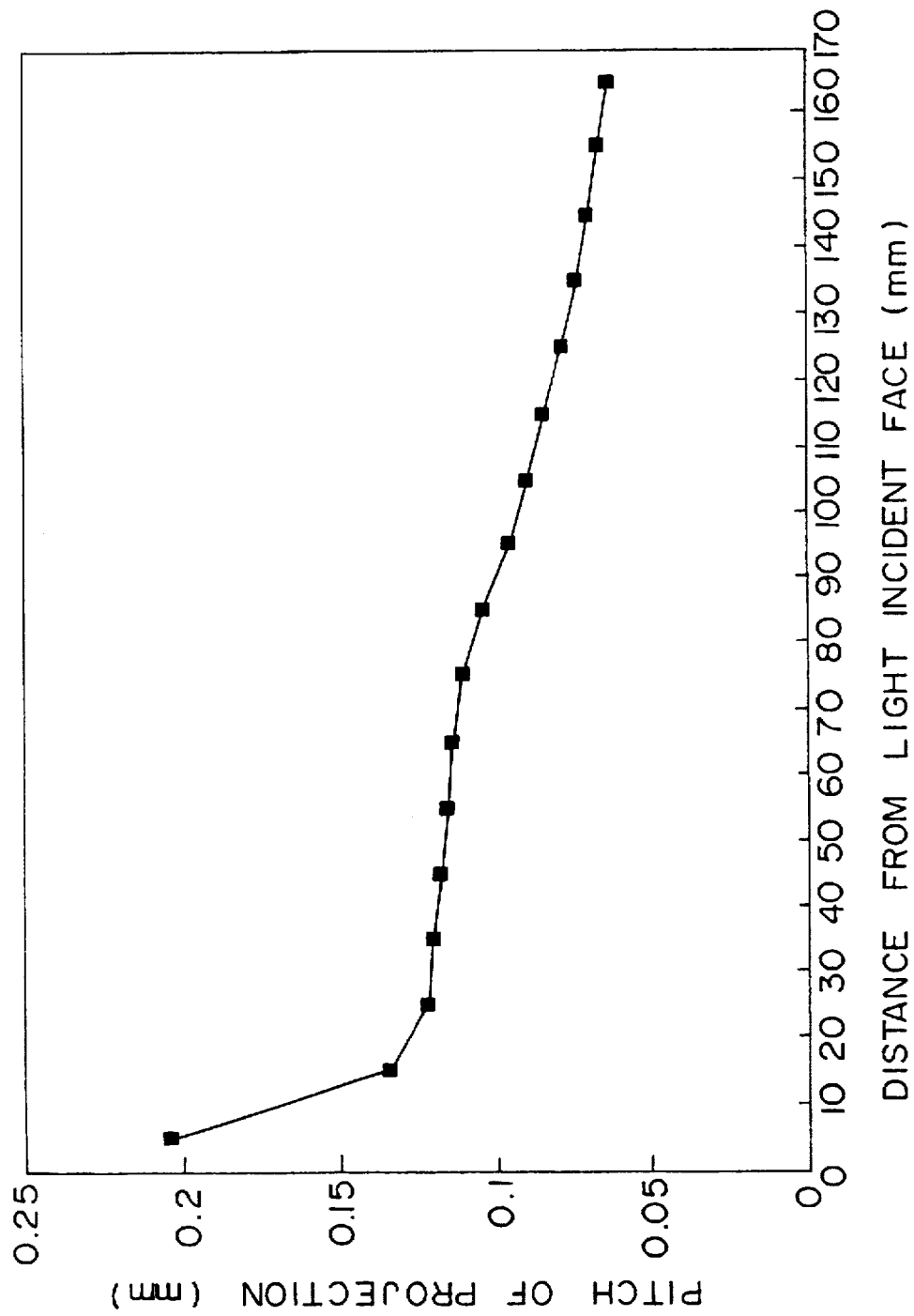
FIG. 23 is a graph showing the design values of the pitches of projections in FIG. 17.

As shown in FIG. 22, the pitch between the vertexes of the adjacent projections 231 is represented by P. FIG. 23 shows the design values of the pitches of the projections 231. The maximum pitch is the pitch between projection No. 1 and projection No. 2, which is 0.204 mm. The pitches of the projections 231 decreases almost monotonically with an increase distance from the tubular light source 221. In addition, the maximum height of the projection 231 on the straight line Y=0 (line X—X) is set to 15.0 μm.

In order to prevent luminance irregularity, the projection area ratio per unit area is increased with distance from the tubular light source 221.

Figure 24:
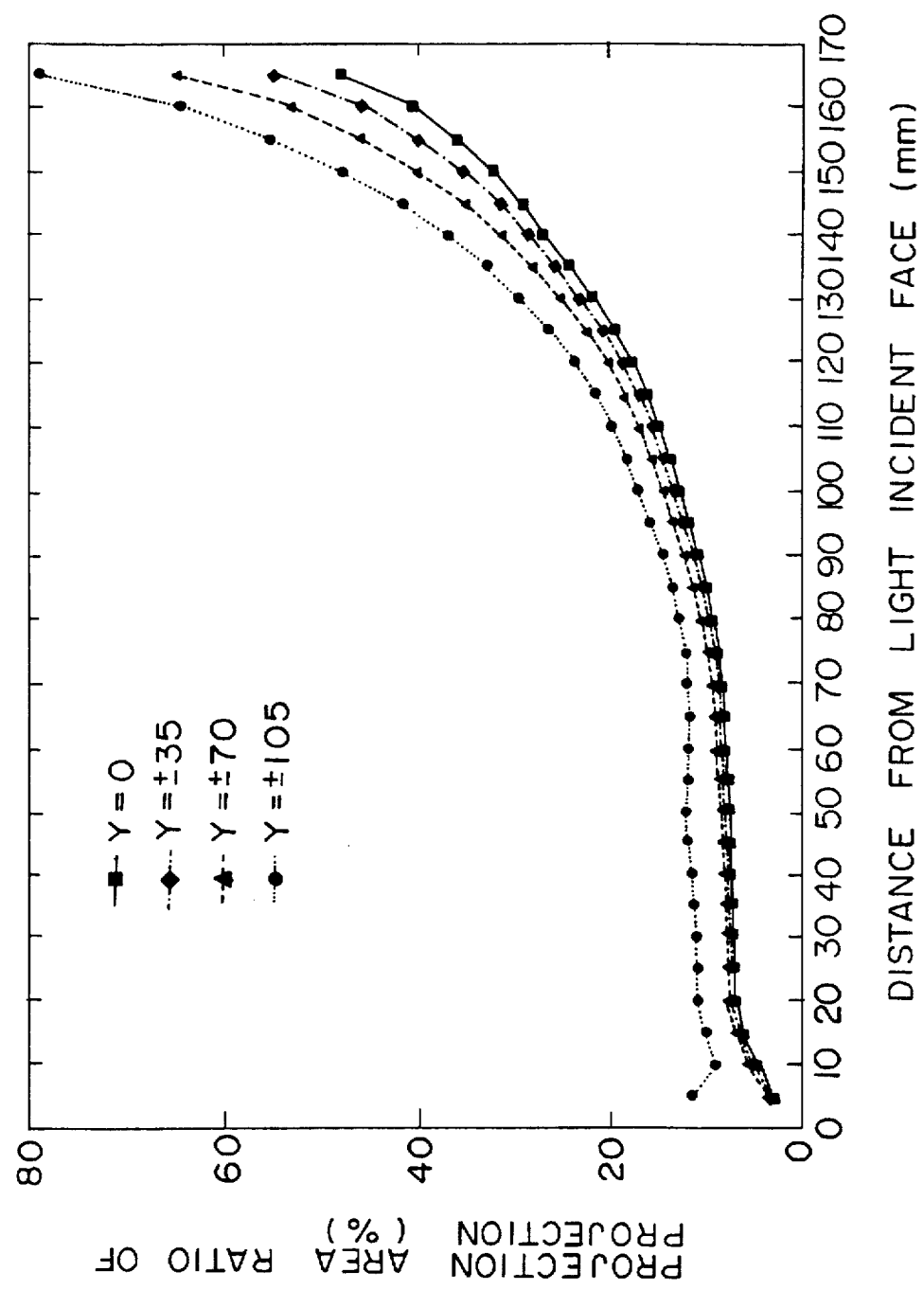
FIG. 24 is a graph showing the design values of the projection area ratios of projections in FIG. 17 per unit area.

FIG. 24 shows the projection area ratio of the projections 231 per unit area (1 mm$^2$) at a given point in the fifth embodiment. Referring to FIG. 24, Y=±35 represents a straight line spaced apart from the straight line Y=0 by 35 mm. As shown in FIG. 24, the projection area ratio is increased with a decrease in distance from the peripheral portions of the tubular light source even while the distance from the light incident face 226 remains the same.

Furthermore, the ratio of change in the projection area ratio of the projections 231 is changed in a direction parallel to the light incident face 226. More specifically, near the tubular light source 221, the ratio of change in the projection area ratios is set to be large in consideration of the non-emission portions of the two ends of the tubular light source 221. Near the center, the ratio of change is set to be small. At a lace spaced apart from the tubular light source 221 (i.e., from the gate G), the ratio of change is set to be large in consideration of difficulty in injecting a resin up to the distal end of each projection 231 in forming the light guide 223.

The light guide 223 was formed to satisfy the following inequality:

15<A<20 in case of 100<L<162 where L is the length (mm) of the effective emission region in a direction perpendicular to the light incident face, and A is the average of projection area ratios (%).

According to the above structure, the following effects can be obtained.

(1) Since the average A of projection area ratios (%) is set to satisfy 15<A<20, luminance irregularity and a decrease in luminance in the effective emission region can be prevented.

If A<15, the absolute amount of projections which are formed in the effective emission region to cause light to emerge outside decreases, and a decrease in luminance occurs in the effective emission region.

If A>20, since too many projections are formed in the effective emission region, some portions exhibit light amount shortages, resulting in luminance irregularity.

(2) Since the formation ratios of the projections 231 are set to satisfy $S(x)-5<Rx<S(x)+5$ where $S(x)=e^{f(x)}$, $f(x)=0.00005(x+65)^2+1.3$, e is the base of a natural logarithm, no luminance irregularity occurs.

If $Rx \leq S(x)-5$, luminance deteriorates and, on the other hand, if $S(x)+5 \leq RX$, luminance irregularity occurs.

(3) Since each projection 231 has a prism-like shape, light incident on the projection can be efficiently caused to emerge from the light guide.

Since each projection 231 has no undercut portion, no slide mold is required to manufacture a light guide by a molding method, facilitating a molding process.

In addition, since 3.0>(length of base of prism projection)/(height of prism projection)>1.0, a high-luminance light guide can be easily molded.

If (length of base of prism projection)/(height of prism projection)>3.0, the height prism projection decreases too much, and the luminance decreases. In contrast to this, if (length of base of prism projection)/(height of prism projection)<1.0, the height of the prism projection increases too much, and mold release is difficult to perform it, resulting in difficulty in performing a molding process.

(4) In general, there are non-emission portions at the two ends of a tubular light source. Such a light source has emission characteristics that the two side portions are darker than the central portion.

In this embodiment, the projection area ratio, which is the ratio of the areas of projections 231 of the light guide 223 to a unit area, is changed in a direction parallel to the light incident face 226 so as to increase from the central portion toward the end portions of the light incident face 226. With this structure, light emerges in an almost uniform amount in a direction parallel to the light incident face 226, and no luminance irregularity occurs in the direction parallel to the light incident face 226.

The present invention is not limited to the fifth embodiment. Although the diffusion sheet 227 and the two collimation sheets 229A and 229B are arranged on the light guide 223, the number and brands of sheets and whether to use sheets can be properly set in accordance with the specifications of a plane light source unit.

In the fifth embodiment, many projections 231 are formed at intervals to be almost parallel to the light incident face 226 of the light guide 223. However, the present invention is not limited to this.

The projections 231 need not be parallel to the light incident face 226 of the light guide 223. In addition, each projection 231 may be in the form of dots instead of the form of an array.

The present inventor used the light guide 223 of the present invention and comparative light guides 223' and 223" for the plane light source unit having the structure shown in FIG. 17 to check the effects of the light guide used in the fifth embodiment of the present invention, thus checking the effects of the present invention.

(1a) Light Guide 223

The light guide 223 had a length of 217 mm in a direction parallel to the tubular light source 221 and a length of 170 mm in a direction perpendicular to the tubular light source 221. The light guide 223 had a wedge-like shape with the light incident face 226 having a height of 3 mm and the reflecting surface 225 having a height of 1 mm. The effective emission region 235 was 121 mm long and 160 mm wide. The light guide 223 was formed by injection molding using the acrylic material "SUMIPEX MG5R" (available from SUMITOMO CHEMICAL CO., LTD.), which is an optical plastic material, as a material for the plate.

An NC lathe machine was used to form grooves in the mirror-polished mold blank of a mold for the light guide 223. The movement coordinates (X and Y coordinates) of a turning tool and the depth of a cut at the coordinate position of the tool were controlled on the submicron order.

Figure 25:
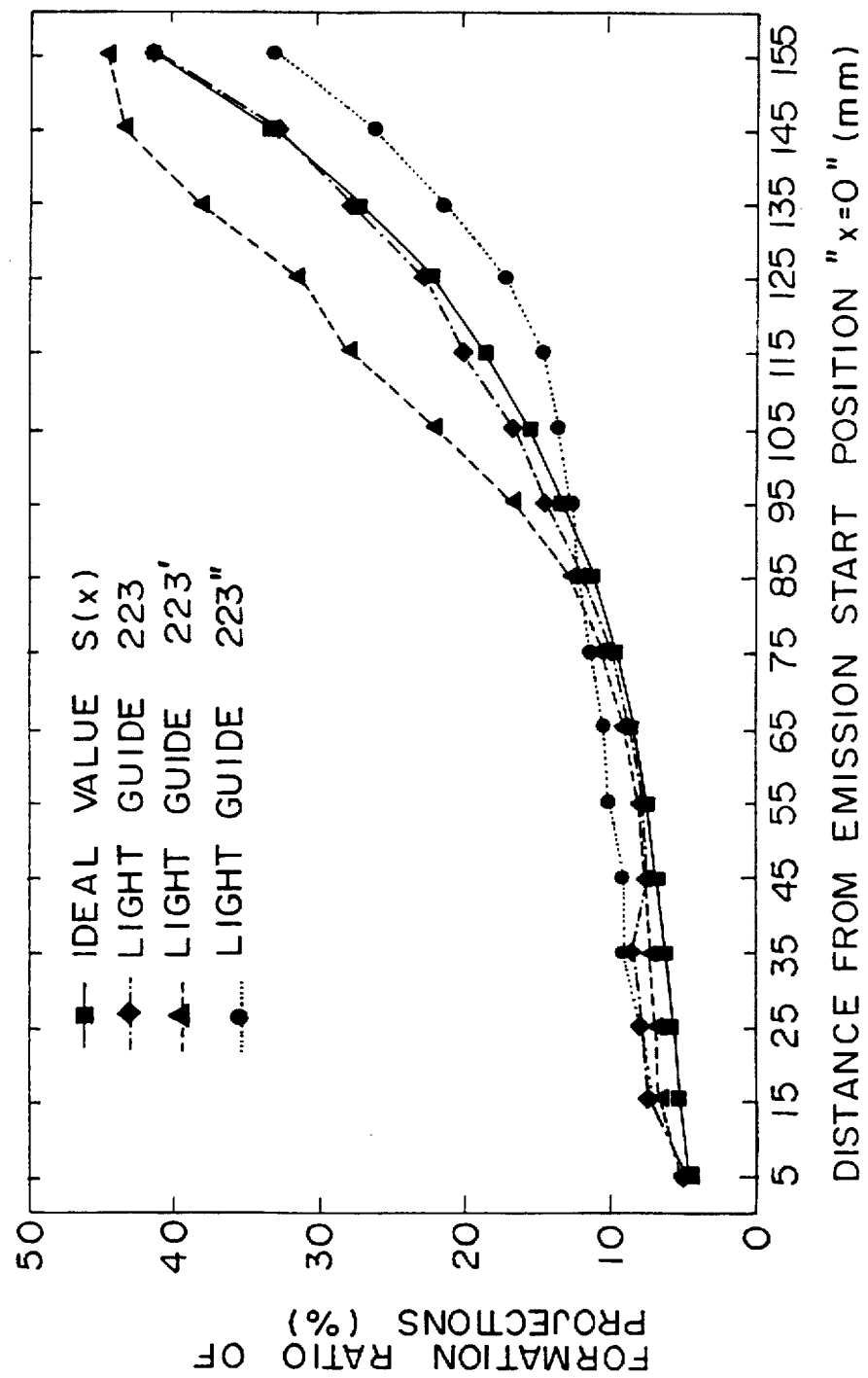
FIG. 25 is a graph showing the formation ratios of projections 231 of a light guide 223 in the fifth embodiment of the present invention, the formation ratios of projections 231' of a comparative light guide 223', the formation ratios of projections 231" of a comparative light guide 223", and ideal formation ratios.

The formation ratio of the projections 231 on the light guide 223 was set to satisfy the curve plotted with (♦) in FIG. 25 at a point x spaced apart from an emission start position O by a distance x (mm) on a straight line (line X—X) perpendicular to the light incident face 226, i.e., to satisfy the following inequality at an arbitrary point x:

$$S(x)-5 < Rx < S(x)+5$$

where $S(x)=e^{f(x)}$, $f(x)=0.00005(x+65)^2+1.3$, e is the base of a natural logarithm, $S(x)=5$ when $S(x)<5$, and $S(x)=95$ when $S(x)>95$.

Figure 26:
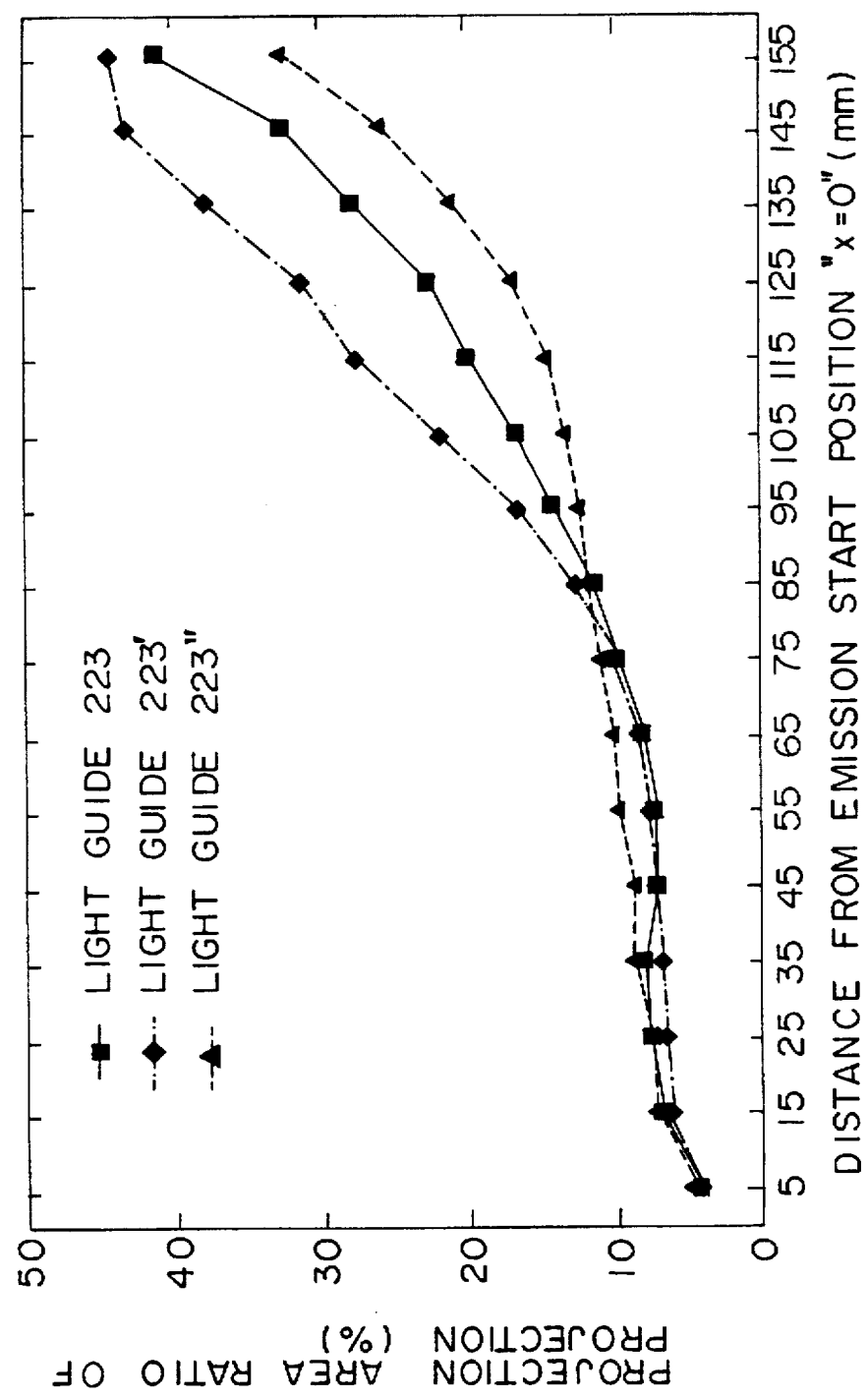
FIG. 26 is a graph showing the projection area ratios of the projections 231 on the light guide 223 in the fifth embodiment of the present invention, the projections 231' of the comparative light guide 223', and the projections 231" of the comparative light guide 223" per unit area.

In addition, the projection area ratios as the percentages of the areas of the projections 231 to unit areas on the straight line Y=0 to the area of the light emitting surface 224 were plotted with (■), as shown in FIG. 26.

FIGS. 21, 23, and 24 show the design values of each projection 231 in the fifth embodiment. 1,686 projections 231 were actually formed in the effective emission region 235 160 mm wide.

The average A of the projection area ratios (%) in the effective emission region 235 was set to be 17.7%.

Since each projection 231 has a prism-like shape with a vertical angle of 65°, (length of base of prism projection)/(height of prism length)=1.99.

(1b) Comparative Light Guide 223'

The comparative light guide 223' was different from the light guide 223 in the formation ratios Rx of projections and the projection area ratios of projections.

The formation ratios Rx of projections 231' of the comparative light guide 223' were plotted with (▲), as shown in FIG. 25, which were greatly deviated from an ideal value S(x).

The projection area ratios of the projections 231' of the comparative light guide 223' were plotted with (♦) larger than (■), as shown in FIG. 26.

The average A of projection area ratios (%) in an effective emission region 235' was set to be 20.4%.

Since each projection 231' has a prism-like shape with a vertical angle of 65°, (length of base of prism projection)/(height of prism length)=1.99 as in the case of the light guide 223.

(1c) Comparative Light Guide 223"

The comparative light guide 223" was different from the light guide 223 in the formation ratios Rx of projections and the projection area ratios of projections.

The formation ratios Rx of projections 231" of the comparative light guide 223" were plotted with (▮, as shown in FIG. 25, which were greatly deviated from the ideal value S(x).

The projection area ratios of the projections 231" of the comparative light guide 223" were plotted with (▲) smaller than (■) (the projection area ratios of the light guide 223), as shown in FIG. 26.

The average A of projection area ratios (%) in an effective emission region 235" was set to be 14.8%.

Since each projection 231" has a prism-like shape like the one shown in FIG. 20, (length of base of prism projection)/(height of prism length)=1.99 as in the case of the light guide 223.

(2a) Other Members (common to all the light guides) Constituting Plane Light Source Unit reflecting plate 222: KIMOTO CORPORATION "REF-WHITE GR38W"

reflecting sheet 228: KIMOTO CORPORATION "REF-WHITE RW 188"

diffusion sheet 227: Keiwa Shoko Co., Ltd. "OPALUS PC-ES130"

collimation sheet 229A: Sumitomo 3M Limited "BEF-90" (the prism ridges were set in a direction perpendicular to the tubular light source, and the flat surface was set on the light guide side)

tubular light source 221 Harison Electric Co., Ltd. "HMBS26 (0.313/0.323) 230C"

(3a) Measurement Conditions tube current: 5 mArms measurement distance: 50 cm luminance meter: TOPCON CORP. "BM-7" (measurement viewing angle: 0.2 deg)

Figure 27:
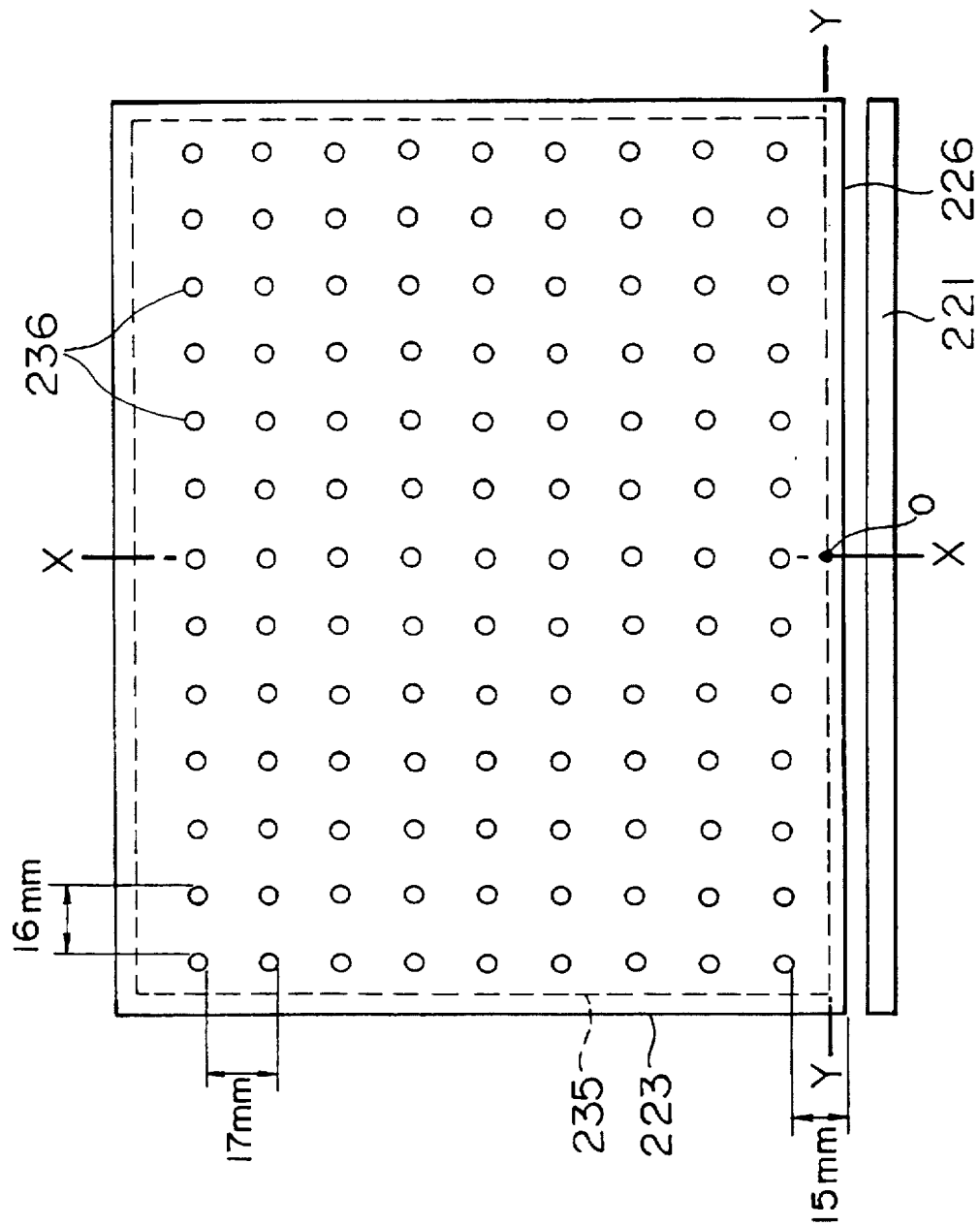
FIG. 27 is a plan view showing the positions of measurement points for front luminances in the fifth embodiment of the present invention.

In the above arrangement, the front luminance (luminance in a direction perpendicular to the effective emission region surface) in the effective emission region was measured, at a room temperature of 24.0°±0.5° C., 30 minutes after the tubular light source was turned on. Nine measurement points were set at a pitch of 16 mm in the longitudinal direction of the effective emission region, and 13 measurement points were set at a pitch of 17 mm in the widthwise direction of the effective emission region. That is, a total of 9×13=117 points were set. FIG. 27 is a plan view of the effective emission region 235, showing the positions of measurement points 236 in the region.

(4a) Measurement Results

EXPERIMENT 1

A plane light source unit was constituted by the light guide 223 and the remaining constituent members listed in (2a), and the projections 231 of the light guide 223 were placed to oppose the liquid crystal panel 230, as shown in FIG. 17. The following were the measurement results under the conditions described in (3a):

maximum luminance value at 117 points: 1,423 cd/m$^2$ minimum luminance value at 117 points: 916 cd/m$^2$ average luminance value at 117 points: 1,213 cd/m$^2$ luminance irregularity (minimum value÷maximum value) at 117 points: 64.6%

Figure 28:
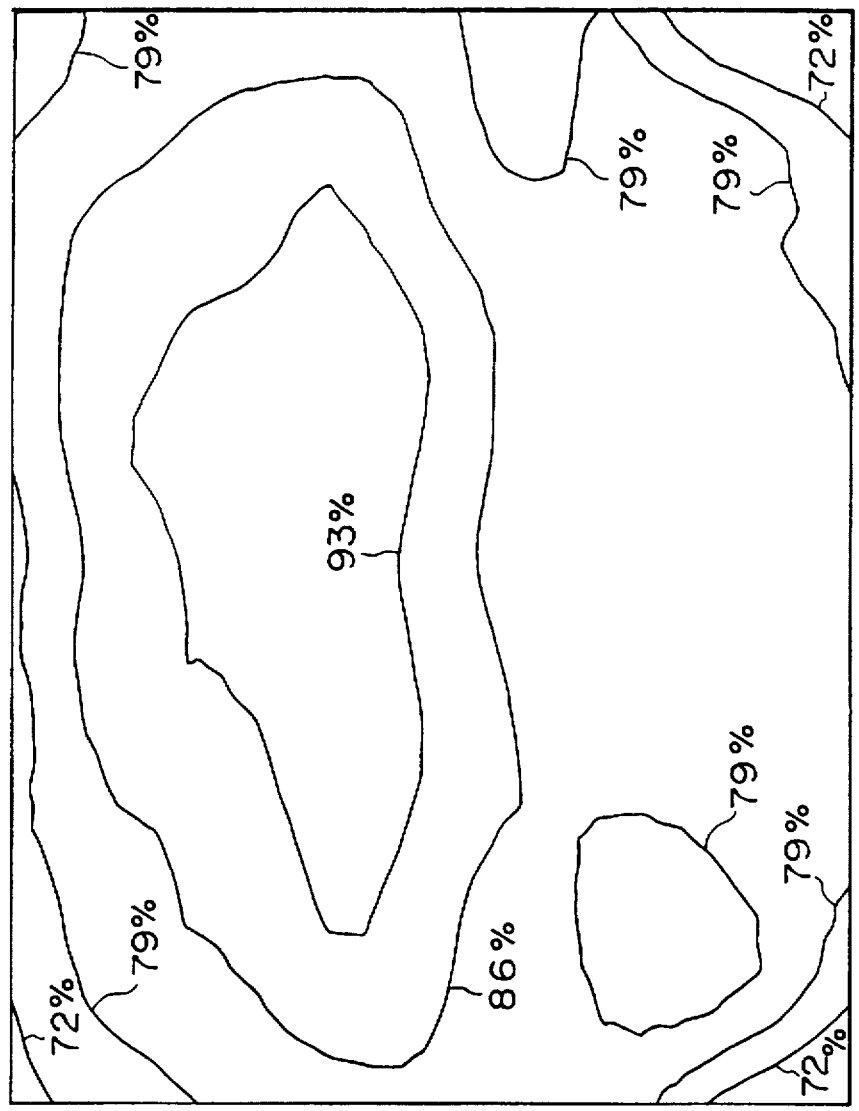
FIG. 28 is a plan view showing a contour line plot of front luminances on the plane light source unit using the light guide 223 according to the fifth embodiment of the present invention.

FIG. 28 shows the contour line distribution of the front luminances in the effective emission region 235, which is plotted on the basis of the measurement results at the above 117 points. This graph indicates the ratio of each front luminance to the maximum luminance. The observation direction in FIG. 28 is the same as that in FIG. 27.

EXPERIMENT 2

A plane light source unit was constituted by the light guide 223' and the remaining constituent members listed in (2a), and the projections 231' of the light guide 223' were placed to oppose the liquid crystal panel 230. The following were the measurement results under the conditions described in (3a):

maximum luminance value at 117 points: 1,545 cd/m² minimum luminance value at 117 points: 756 cd/m² average luminance value at 117 points: 1,199 cd/m² luminance irregularity (minimum value÷maximum value) at 117 points: 48.9%

Figure 29:
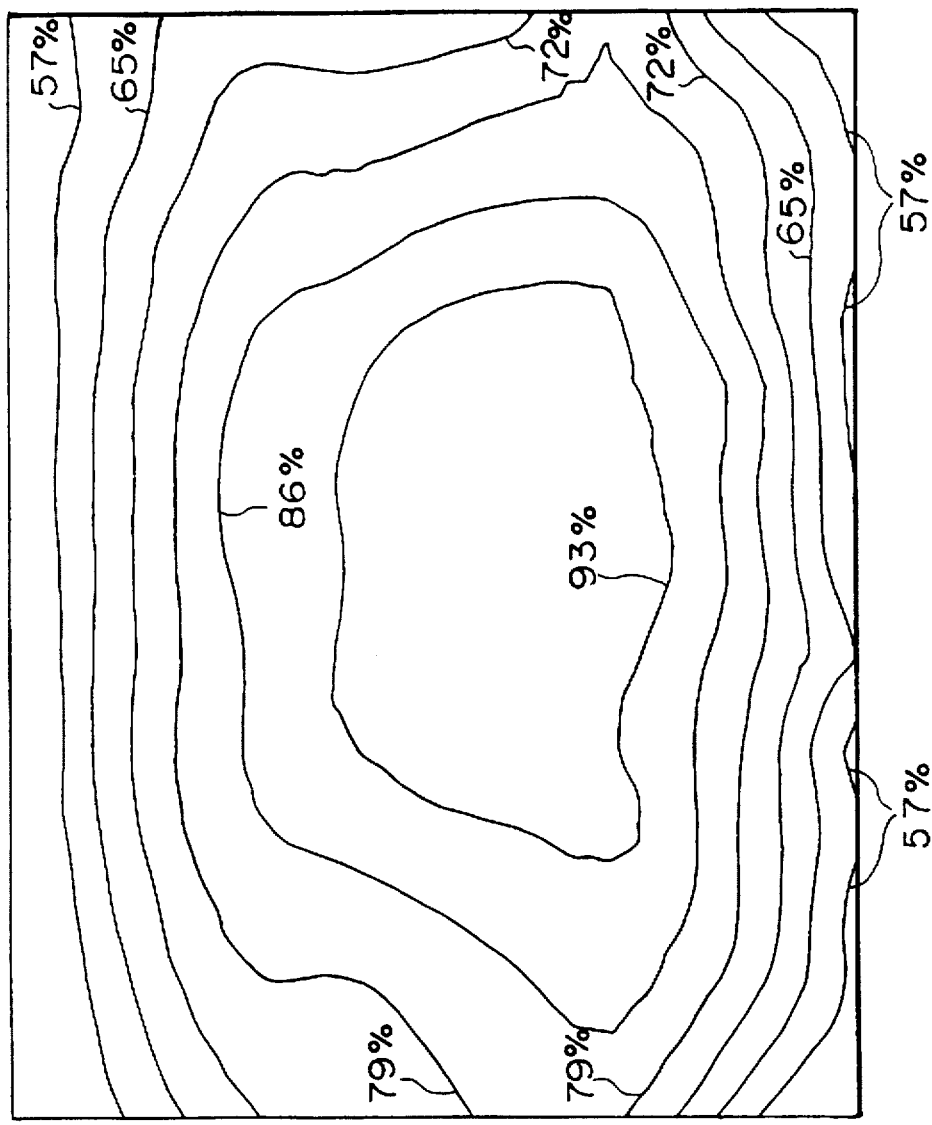
FIG. 29 is a plan view showing a contour line plot of front luminances on the plane light source unit using the comparative light guide 223'.

FIG. 29 shows the contour line distribution of the front luminances in the effective emission region 235, which is plotted on the basis of the measurement results at the above 117 points. The observation direction in FIG. 29 is also the same as that in FIG. 27.

EXPERIMENT 3

A plane light source unit was constituted by the light guide 223" and the remaining constituent members listed in (2a), and the projections 231" of the light guide 223" were placed to oppose the liquid crystal panel 230. The following were the measurement results under the conditions described in (3a):

maximum luminance value at 117 points: 1,331 cd/m² minimum luminance value at 117 points: 747 cd/m² average luminance value at 117 points: 1,068 cd/m² luminance irregularity (minimum value÷maximum value) at 117 points: 56.1%

Figure 30:
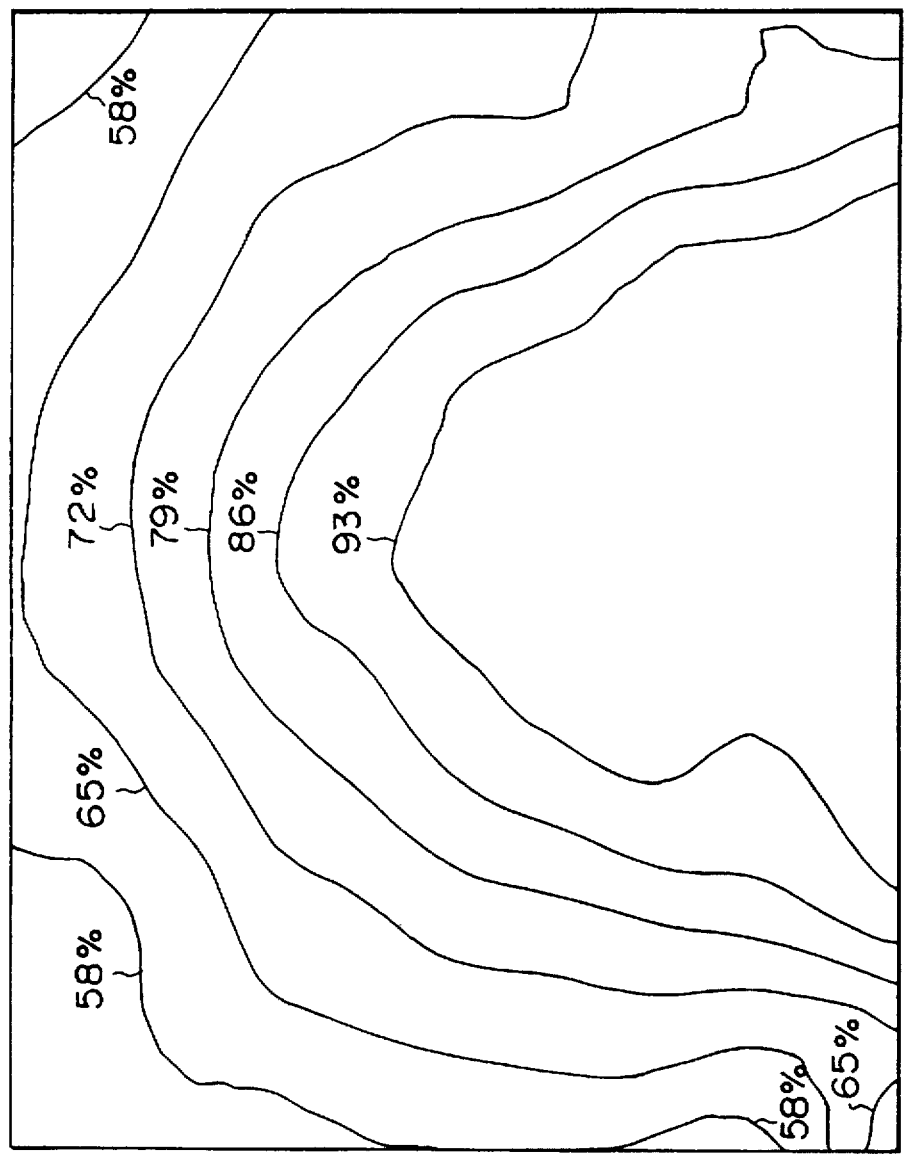
FIG. 30 is a plan view showing a contour line plot of front luminances on the plane light source unit using the comparative light guide 223"

FIG. 30 shows the contour line distribution of the front luminances in the effective emission region 235, which is plotted on the basis of the measurement results at the above 117 points. The observation direction in FIG. 30 is the same as that in FIG. 27.

The following effects are clarified according to these three experiments. ① With the use of the light guide 223, which satisfies 15<A<20 where A is the average value of projection area ratios (%), and S(x)−5<Rx<S(x)+5 where Rx is the formation ratio of projections, the intervals between the contour lines are large, and uniform emission occurs in a wide region, as shown in FIG. 28. In addition, a decrease in luminance is suppressed, and the luminance irregularity is as small as 64%. ② With the use of the comparative light guide 223', which satisfies A≦15 where A is the average value of projection area ratios (%), and S(x)+5≦Rx where Rx is the formation ratio of projections, the number of projections which cause light to emerge outside decreases. As shown in FIG. 29, the intervals between the contour lines are small, uniform emission occurs in a narrow region, and a decrease in luminance occurs. The luminance greatly decreases especially in a place spaced apart from the tubular light source 221. Furthermore, the luminance irregularity is as large as 48.9%. ③ With the use of the comparative light guide 223", which satisfies A>20 where A is the average value of projection area ratios (%), and Rx<S(x)−5 where Rx is the formation ratio of projections, the number of projections which cause light to emerge outside increases. As shown in FIG. 30, the intervals between the contour lines are small, uniform emission occurs in a narrow region, and a decrease in luminance occurs. Furthermore, the luminance irregularity is as large as 56.1%.

Now, the relation between the average value A (%) of projection area ratios and the length L (mm) of the effective emission region in the direction perpendicular to the light incident surface is explained as follows.

Generally, in a light guide having a particular length L1 mm, the average value A1% of the projection area ratios is designed such that a total quantity of light entering at an incident face of the light guide is entirely emitted from the whole of a light emitting surface of the light guide. Accordingly, if the length L is changed to L2 mm longer than L1 mm, while the average value A1% of the projection area ratios is left intact, the quantity of light emitted from the neighborhood of a portion where is at a distance of L1 mm from the light source side is decreased, resulted in lowering a luminance which is undesirable.

Thus, such a relation between A and L that when a specific L is changed, A optimum to the changed L is changed also is realized, and therefore an optimum A with respect to a specific L is obtained.

In a similar manner, such a relation between an ideal value S(x) and L that when a specific L is changed, the ideal value S(x) optimum to the changed L is changed also is realized, and therefore an optimum ideal value S(x) with respect to a specific L is obtained.

The sixth embodiment of the present invention will be described next with reference to FIGS. 31 to 40.

Figure 31:
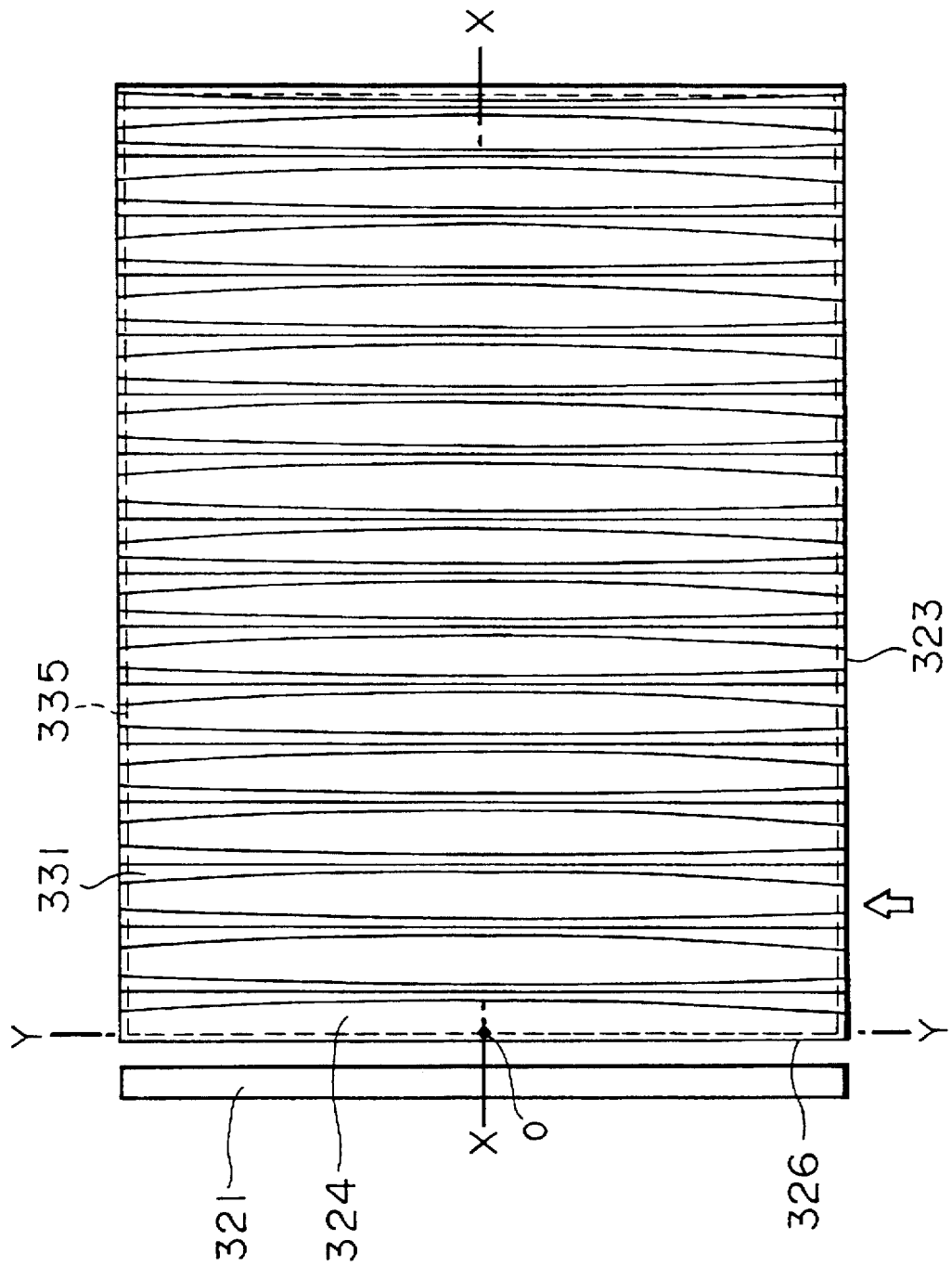
FIG. 31 is a plan view, similar to FIG. 18, showing a sixth embodiment from which a diffusion sheet, a collimation sheet, and a liquid crystal panel are omitted.

FIG. 31 is a plan view of a plane light source unit using a diagonal length of 12.1-inch effective emission region, from which a diffusion sheet, a collimation sheet, and a liquid crystal panel are omitted.

The sixth embodiment is different from the fifth embodiment only in the fact that a length of light is arranged at a short side of the effective emission region, but not at a long side thereof and that the size of an effective emission region is large. Other constituent members of the sixth embodiment are identical or similar to those of the fifth embodiment, and hence illustrations and a description thereof will be omitted to avoid a repetitive description. A description of some members will be made, as needed, with reference to FIGS. 17 and 19A, 19B, 20 and 22 associated with the fifth embodiment.

Figure 32:
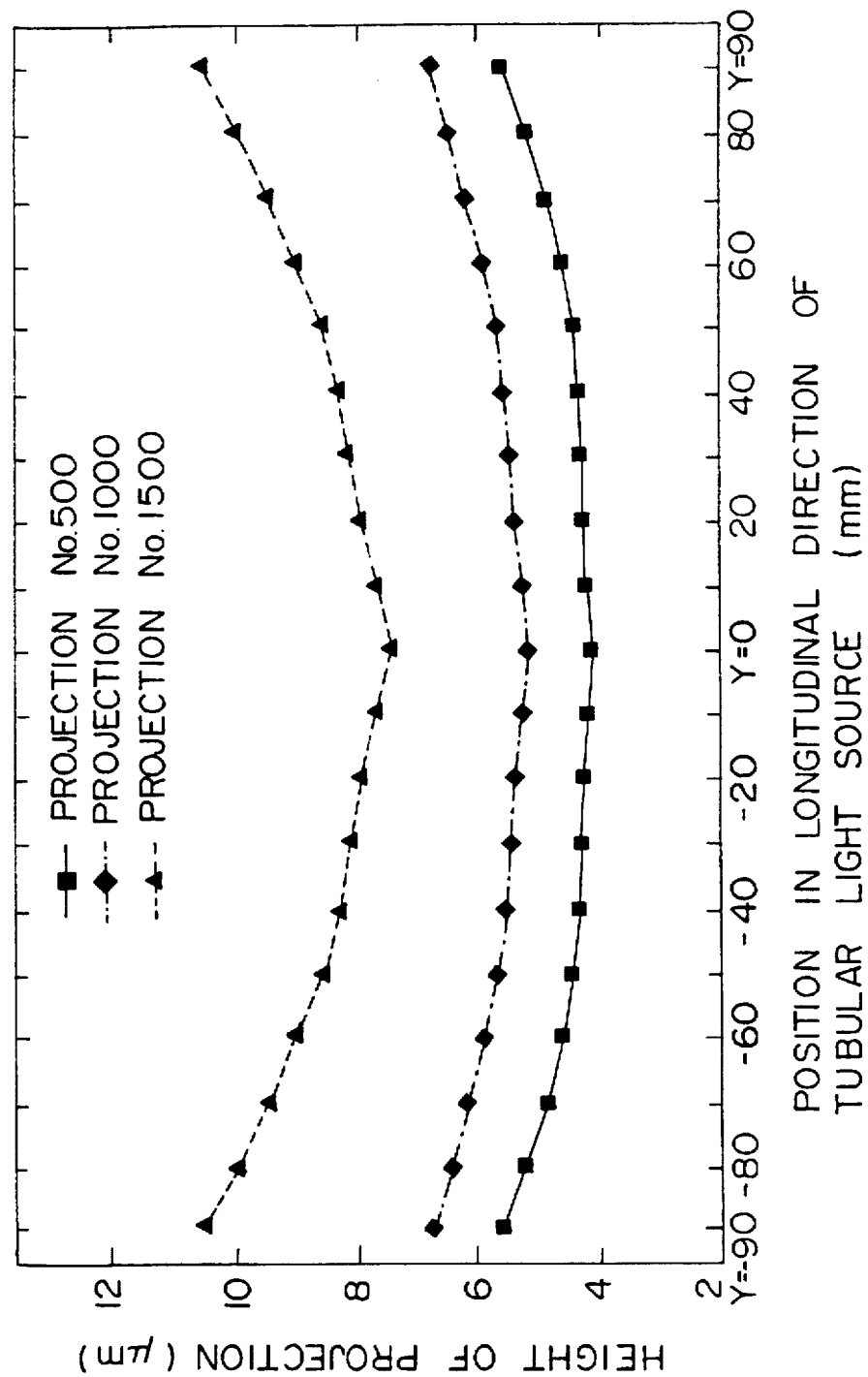
FIG. 32 is a graph, similar to FIG. 21, for explaining changes in the heights of projections of the sixth embodiment.

FIG. 32 shows the design values of the heights of typical projections 331 (a projection near the tubular light source 321, projection No. 500, a projection near the center, projection No. 1000, and a projection spaced apart from the tubular light source, projection No. 1500) of the projections 331 formed on the light guide 323 in the sixth embodiment. Each projection No. indicates a projection number counted from the light incident face 326 side.

Figure 33:
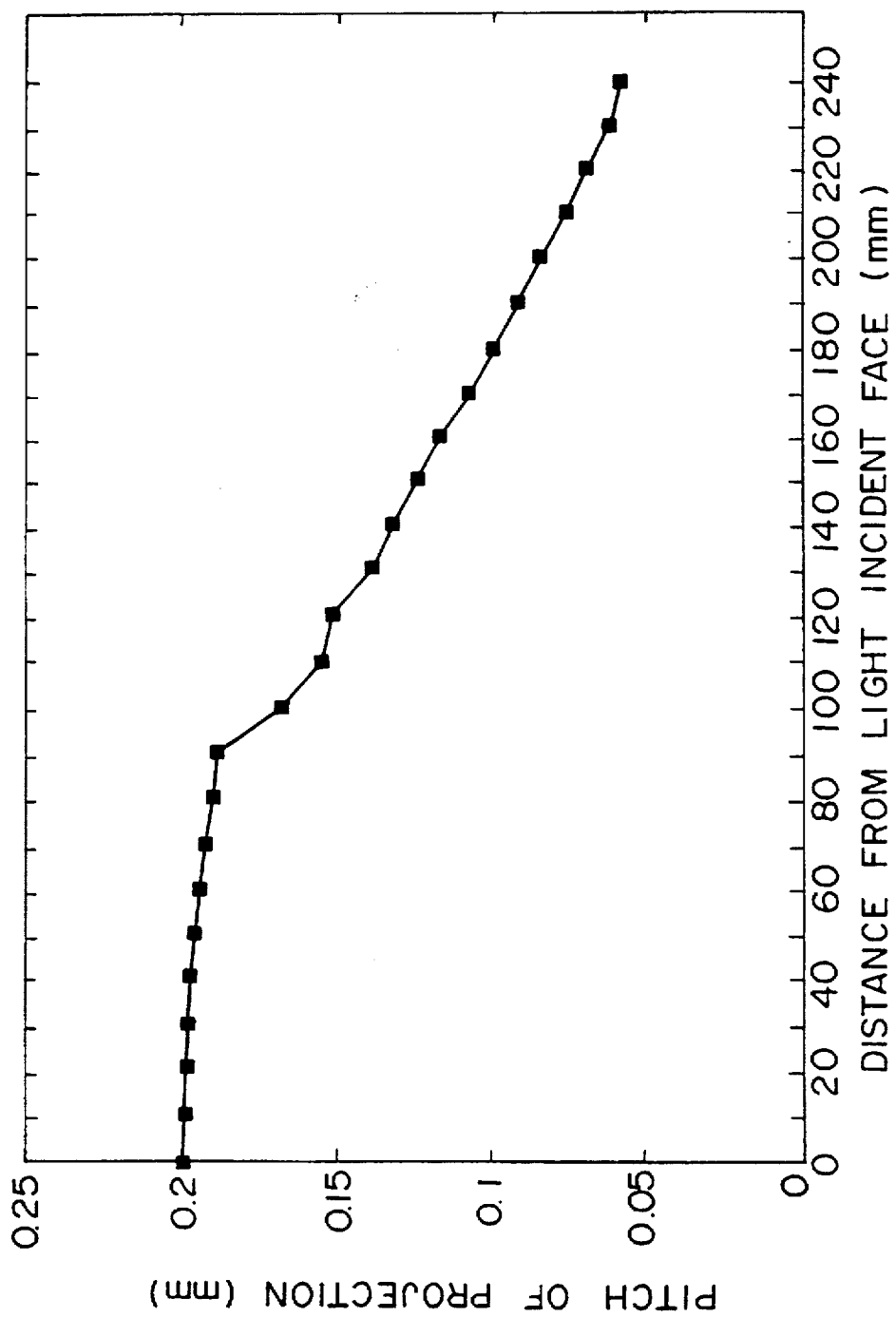
FIG. 33 is a graph, similar to FIG. 23, showing the design values of pitches of projections of the sixth embodiment.

As shown in FIG. 22, the pitch between the vertexes of the adjacent projections 331 is represented by P. FIG. 33 shows the design values of the pitches of the projections 331. The maximum pitch is the pitch between projection No. 1 and projection No. 2, which is 0.200 mm. The pitches of the projections 331 decreases almost monotonically with an increase distance from the tubular light source 321. In addition, the maximum height of the projection 331 on the straight line Y=0 (line X—X) is set to 15.0 µm.

In order to prevent luminance irregularity, the projection area ratio per unit area is increased with distance from the tubular light source 321.

Figure 34:
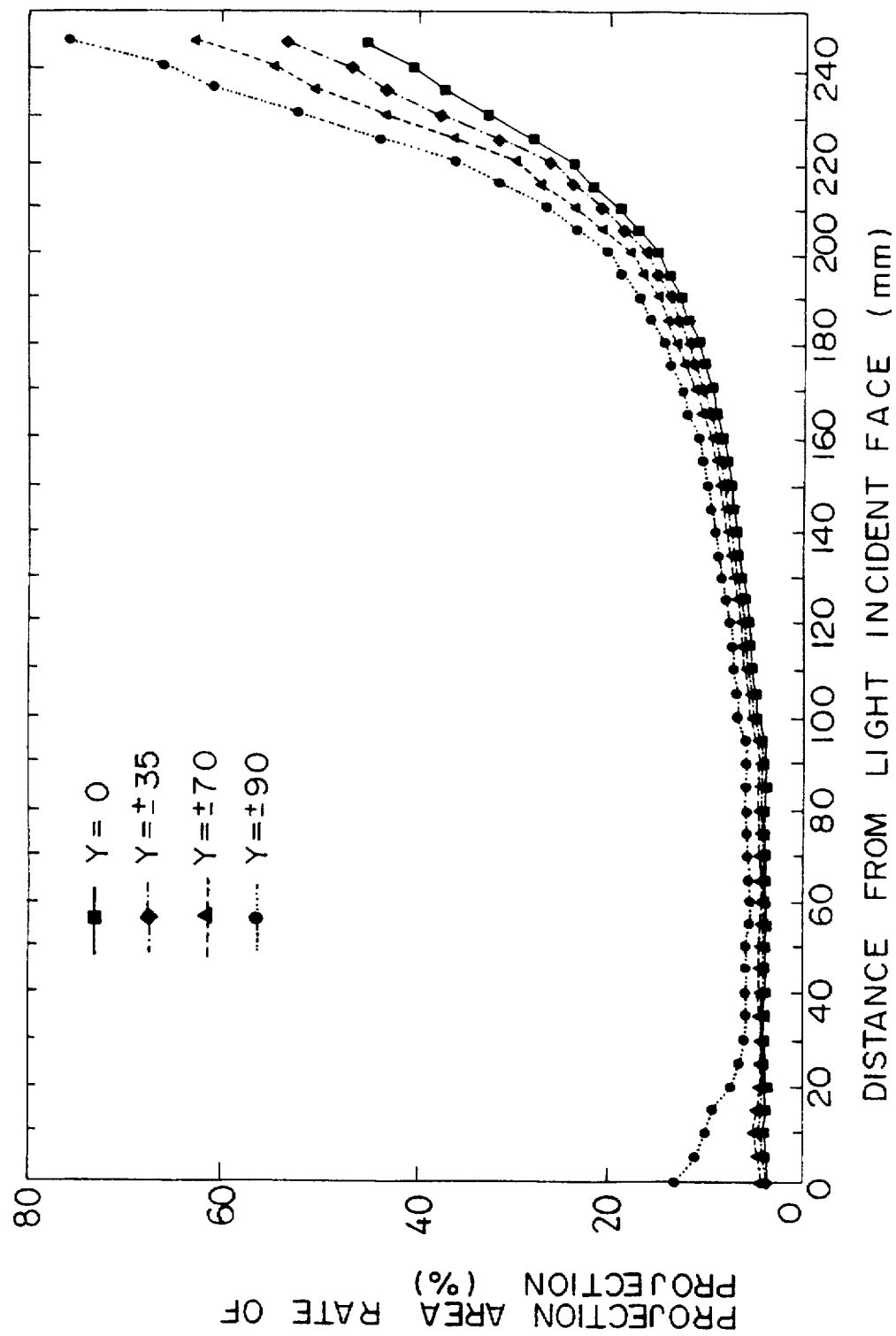
FIG. 34 is a graph, similar to FIG. 24, showing the design values of the projection area ratios of projections of the sixth embodiment per unit area.

FIG. 34 shows the projection area ratio of the projections 231 per unit area (1 mm²) at a given point in the sixth embodiment. Referring to FIG. 34, Y=±35 represents a straight line spaced apart from the straight line Y=0 by 35 mm. As shown in FIG. 34, the projection area ratio is increased with a decrease in distance from the peripheral portions of the tubular light source even while the distance from the light incident face 326 remains the same.

Furthermore, the ratio of change in the projection area ratio of the projections 331 is changed in a direction parallel to the light incident face 326. More specifically, near the tubular light source 321, the ratio of change in the projection area ratios is set to be large in consideration of the non-emission portions of the two ends of the tubular light source 321. Near the center, the ratio of change is set to be small. At a place spaced apart from the tubular light source 321 (i.e., from the gate G), the ratio of change is set to be large in consideration of difficulty in injecting a resin up to the distal end of each projection 331 in forming the light guide 323.

A formation ratio Rx of projections formed on a light guide used for the plane light source unit of the sixth embodiment will be described below.

As in the fifth embodiment, the formation ratio Rx in the sixth embodiment is defined by equation (1) above. However, projections 331 were formed on a light guide 323 to satisfy $$S(x)-3<Rx<S x+3$$

wherein $S(x)=e^{g(x)}$, $g(x)=0.00005(x-11)^2+1.1$, and $e$ is the base of a natural logarithm.

With this structure, no luminance irregularity occurred.

When $Rx \leq S(x)-3$ or $S(x)+3 \leq Rx$, luminance irregularity occurred.

The light guide 323 was formed to realize the following relation between L and A:

$$11<A<15 \text{ in case of } 220<L<270$$

where L is the length (mm) of the effective emission region in a direction perpendicular to the light incident face, and A is the average of projection area ratios (%).

According to the above structure, the following effects can be obtained.

(I) Since the average A of projection area ratios (%) is set to satisfy 11<A<15 (220<L<270), luminance irregularity and a decrease in luminance in the effective emission region can be prevented.

If A<11, the absolute amount of projections which are formed in the effective emission region to cause light to emerge outside decreases, and a decrease in luminance occurs in the effective emission region.

If $A \geq 15$, since too many projections are formed in the effective emission region, some portions exhibit light amount shortages, resulting in luminance irregularity.

(II) Since the formation ratios of the projections 331 are set to satisfy $$S(x)-3<Rx<S(x)+3$$

where $S(x)=e^{g(x)}$, $g(x)=0.00005(x-11)^2+1.1$, e is the base of a natural logarithm, no luminance irregularity occurs.

If $Rx<S(x)-3$, luminance deteriorates and, on the other hand, if $S(x)+3<RX$, luminance irregularity occurs.

(III) Since each projection 331 has a prism-like shape, light incident on the projection can be efficiently caused to emerge from the light guide.

Since each projection 331 has no undercut portion, no slide mold is required to manufacture a light guide by a molding method, facilitating a molding process.

In addition, since 3.0>(length of base of prism projection)/(height of prism projection)>1.0, a high-luminance light guide can be easily molded.

If (length of base of prism projection)/(height of prism projection)>3.0, the height prism projection decreases too much, and the luminance decreases. In contrast to this, if (length of base of prism projection)/(height of prism projection)<1.0, the height of the prism projection increases too much, and mold release is difficult to perform it, resulting in difficulty in performing a molding process.

(IV) In general, there are non-emission portions at the two ends of a tubular light source. Such a light source has emission characteristics that the two side portions are darker than the central portion.

In this embodiment, the projection area ratio, which is the ratio of the areas of projections 331 of the light guide 323 to a unit area, is changed in a direction parallel to the light incident face 326 so as to increase from the central portion toward the end portions of the light incident face 326. With this structure, light emerges in an almost uniform amount in a direction parallel to the light incident face 326, and no luminance irregularity occurs in the direction parallel to the light incident face 326.

In the sixth embodiment, many projections 331 are formed at intervals to be almost parallel to the light incident face 326 of the light guide 323. However, the present invention is not limited to this.

The projections 331 need not be parallel to the light incident face 326 of the light guide 323. In addition, each projection 331 may be in the form of dots instead of the form of an array.

The present inventors used the light guide 323 of the present invention and comparative light guides 323' and 323" for the plane light source unit having the structure shown in FIG. 17 to check the effects of the light guide used in the sixth embodiment of the present invention, thus checking the effects of the present invention.

(1d) Light Guide 323

The light guide 323 had a length of 188 mm in a direction parallel to a tubular light source 321 and a length of 249 mm in a direction perpendicular to the tubular light source 321. The light guide 323 had a wedge-like shape with a light incident face 326 having a height of 3 mm and a reflecting surface having a height of 1 mm. An effective emission region 335 was 248 mm long and 196 mm wide. The light guide 323 was formed by injection molding using the acrylic material "SUMIPEX MG5R" (available from SUMITOMO CHEMICAL CO., LTD.), which is an optical plastic material, as a material for the plate.

An NC lathe machine was used to form grooves in the mirror-polished mold blank of a mold for the light guide 323. The movement coordinates (X and Y coordinates) of a turning tool and the depth of a cut at the coordinate position of the tool were controlled on the submicron order.

Figure 35:
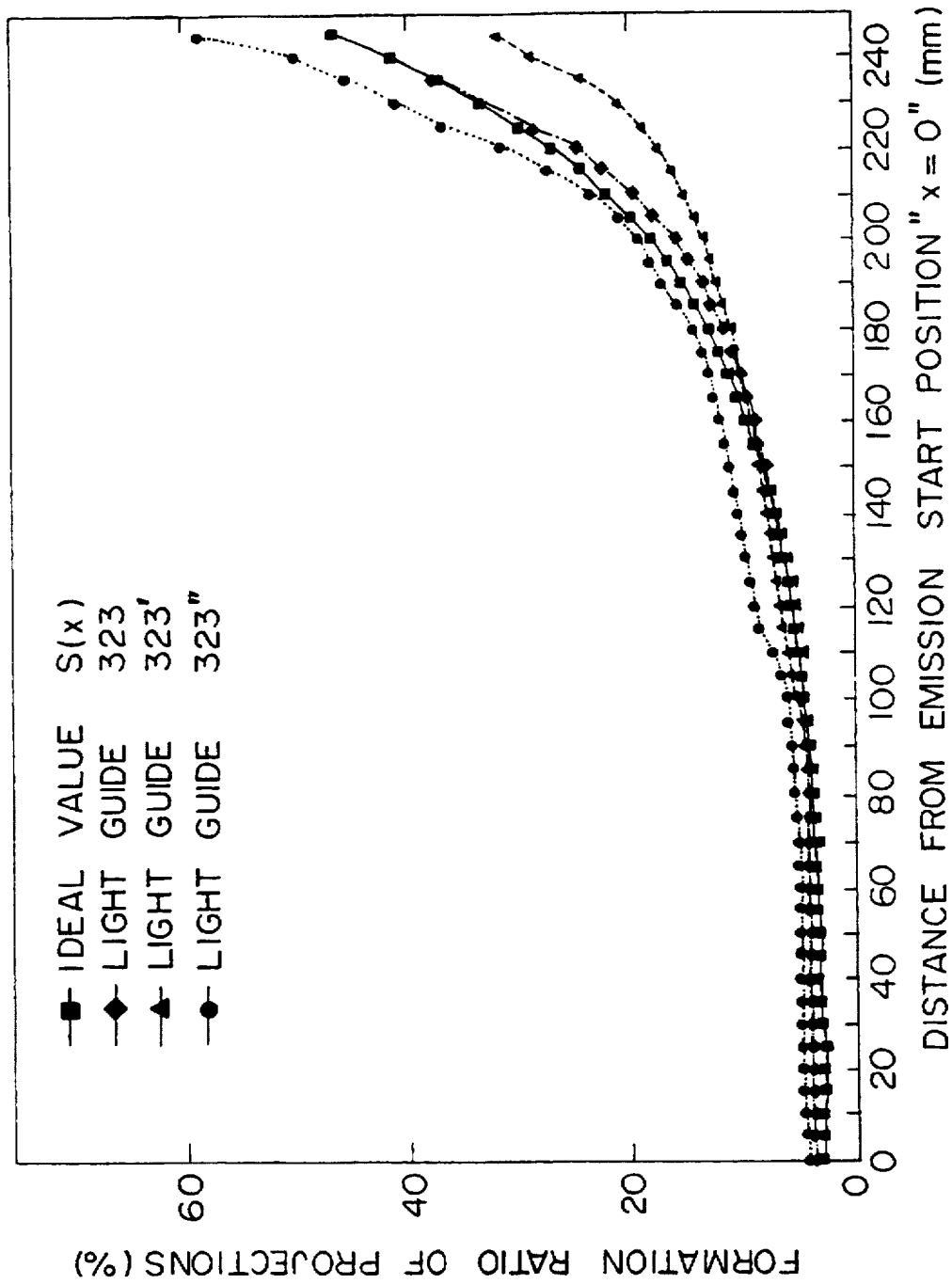
FIG. 35 is a graph showing the formation ratios of projections 331 of a light guide 323 in the sixth embodiment of the present invention, the formation ratios of projections 331' of a comparative light guide 323', the formation ratios of projections 331" of a comparative light guide 323", and ideal formation ratios.

The formation ratio of the projections 331 on the light guide 323 was set to satisfy the curve plotted with (♦) in FIG. 35 at a point x spaced apart from an emission start position O by a distance x (mm) on a straight line (line X—X) passing through the center of the effective emission region 335 of the light guide 323 and perpendicular to the light incident face 326, i.e., to satisfy the following inequality at an arbitrary point x:

$$S(x)-3<Rx<S(x)+3$$

where $S(x)=e^{g(x)}$, $g(x)=0.00005(x-11)^2+1.1$, and e is the base of a natural logarithm.

Figure 36:
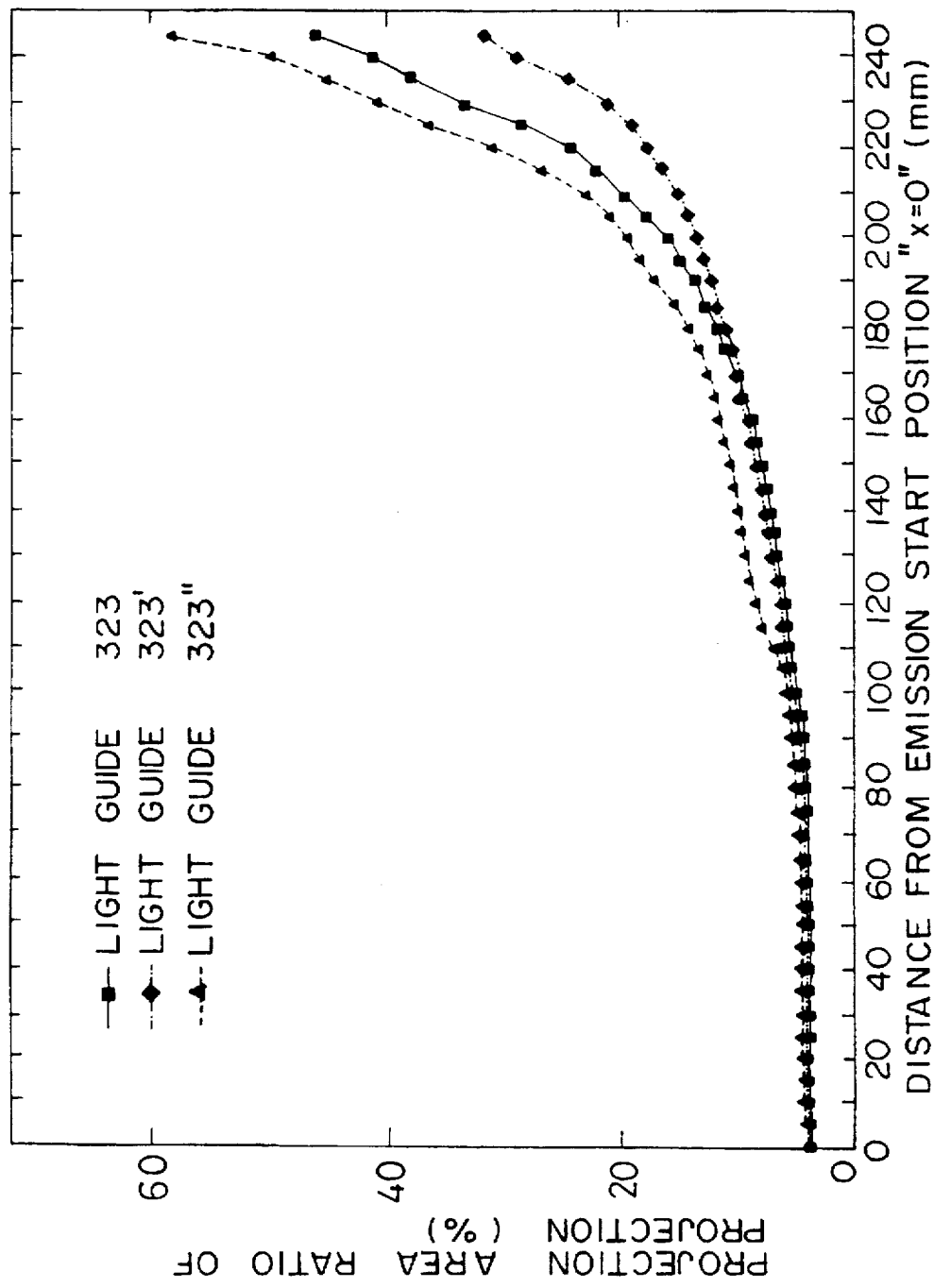
FIG. 36 is a graph showing the projection area ratios of the projections 331 on the light guide 323 in the sixth embodiment of the present invention, the projections 331' of the comparative light guide 323', and the projections 331" of the comparative light guide 323" per unit area.

In addition, the projection area ratios as the percentages of the areas of the projections 331 unit areas on a straight line Y=0 (line X—X) to the area of a light emitting surface 324 were plotted with (■) in FIG. 36.

The design values of each projection 331 in the sixth embodiment are the same as those in FIGS. 32, 33, and 34. 2088 projections 331 were actually formed in the effective emission region 335 248 mm long.

The average A of the projection area ratios in the effective emission region 335 was set to be 12.5% to satisfy 11<A<15.

Since each projection 331 has a prism-like shape with a vertical angle of 65°, (length of base of prism projection)/(height of prism length)=2.0.

27

(1e) Comparative Light Guide 323'

The comparative light guide 323' was different from the light guide 323 in the formation ratios Rx of projections and the projection area ratios of projections.

The formation ratios Rx of projections 331' of the comparative light guide 323' were plotted with (▲), as shown in FIG. 35, which were greatly deviated from an ideal value S(x).

The projection area ratios of the projections 331' of the comparative light guide 323' were plotted with (♦) larger than (■), as shown in FIG. 36.

The average A of projection area ratios (%) in an effective emission region 335' was set to be 10.6% which is out of 11<A<15.

Since each projection 331' has a prism-like shape with a vertical angle of 65°, (length of base of prism projection)/(height of prism length)=2.0 as in the case of the light guide 323.

(1f) Comparative Light Guide 323"

The comparative light guide 323" was different from the light guide 323 in the formation ratios Rx of projections and the projection area ratios of projections.

The formation ratios Rx of projections 331" of the comparative light guide 323" were plotted with (◐ in FIG. 35, which were greatly deviated from the ideal value S(x).

The projection area ratios of the projections 331" of the comparative light guide 323" were plotted with (▲) smaller than (M) (the projection area ratios of the light guide 323), as shown in FIG. 36.

The average A of projection area ratios in an effective emission region 335" was set to be 15.8%, which fell outside the range of 11<A<15.

Since each projection 331" has a prism-like shape like the one shown in FIG. 22, (length of base of prism projection)/(height of prism length)=2.0 as in the case of the light guide 323.

(2b) Other Members (common to all the light guides) Constituting Plane Light Source Unit reflecting plate: KIMOTO CORPORATION "REF-WHITE GR38W"

reflecting sheet: KIMOTO CORPORATION "REF-WHITE RW 188"

diffusion sheet: Keiwa Shoko Co., Ltd. "OPALUS PC-ES130"

collimation sheet: Sumitomo 3M Limited "BEF-II" (the prism ridges were set in a direction perpendicular to the tubular light source, and the flat surface was set on the light guide side)

collimation sheet: Sumitomo 3M Limited "BEF-II" (the prism ridges were set in a direction perpendicular to the tubular light source, and the flat surface was set on the light guide side)

tubular light source 221 Harison Electric Co., Ltd. "HMBVM22B76W186W/AX"

(3b) Measurement Conditions tube current: 3.5 mArms measurement distance: 50 cm luminance meter: TOPCON CORP. "BM-7" (measurement viewing angle: 0.2 deg)

In the above arrangement, the front luminance (luminance in a direction perpendicular to the effective emission region surface) in the effective emission region was measured, at a room temperature of 24.0°–±0.5° C., 30 minutes after the tubular light source was turned on. 15 measurement points were set at a pitch of 16 mm in the longitudinal direction of the effective emission region, and 11 measurement points

Figure 37:
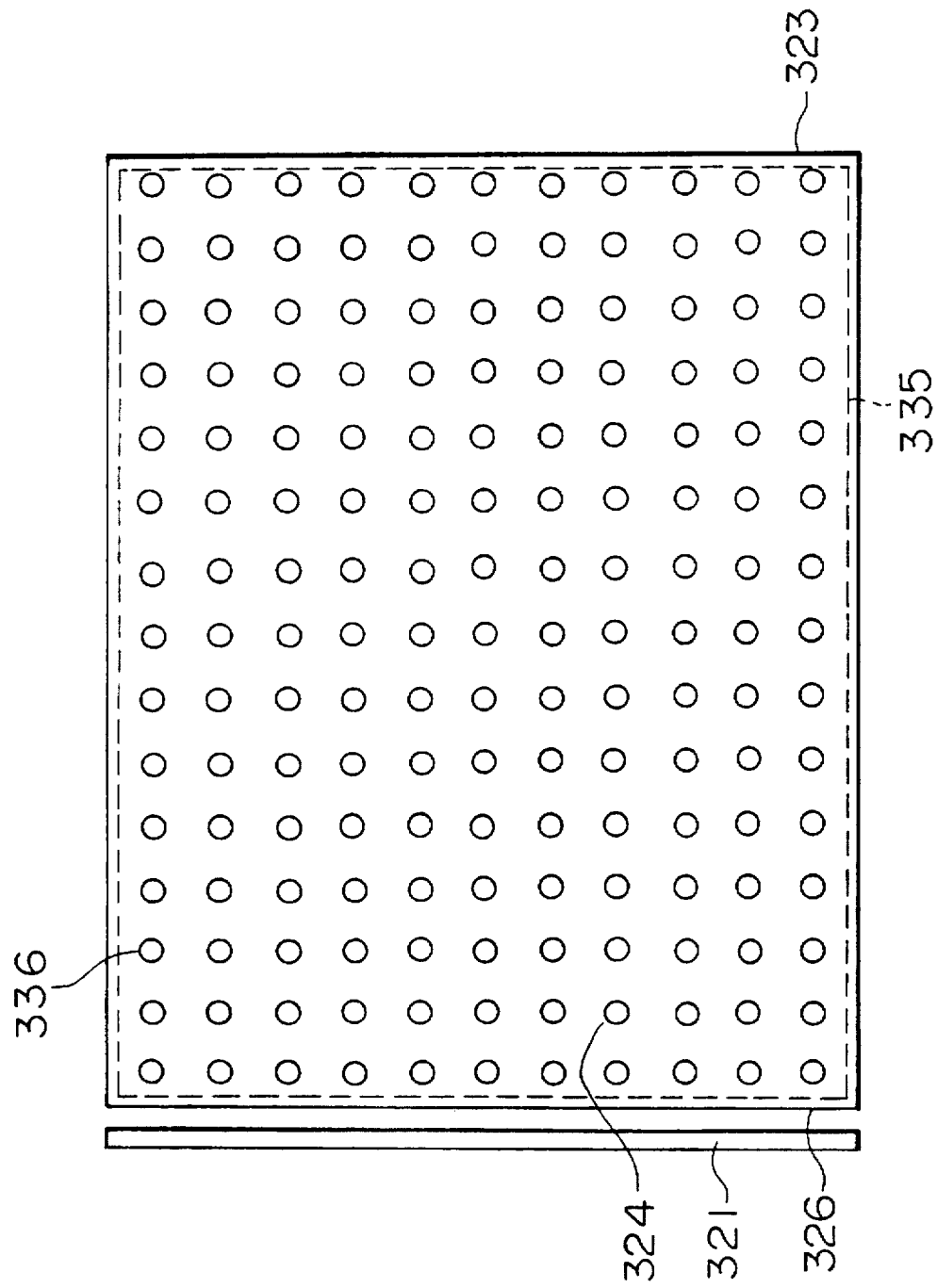
FIG. 37 is a plan view showing the positions of measurement points for front luminances in the sixth embodiment of the present invention.

28 were set at a pitch of 17 mm in the widthwise direction of the effective emission region. That is, a total of 15×11=165 points were set. FIG. 37 is a top plan view of the effective emission region 335, showing the positions of measurement points 336 in the region.

(4b) Measurement Results

EXPERIMENT 4

A plane light source unit was constituted by the light guide 323 and the remaining constituent members listed in (2b), and the projections 331 of the light guide 323 were placed to oppose the liquid crystal panel 330, as shown in FIG. 17. The following were the measurement results under the conditions described in (3b):

maximum luminance value at 165 points: 1132 cd/m$^2$ minimum luminance value at 165 points: 722 cd/m$^2$ average luminance value at 165 points: 992 cd/m$^2$ luminance irregularity (minimum value÷maximum value) at 165 points: 63.8%

Figure 38:
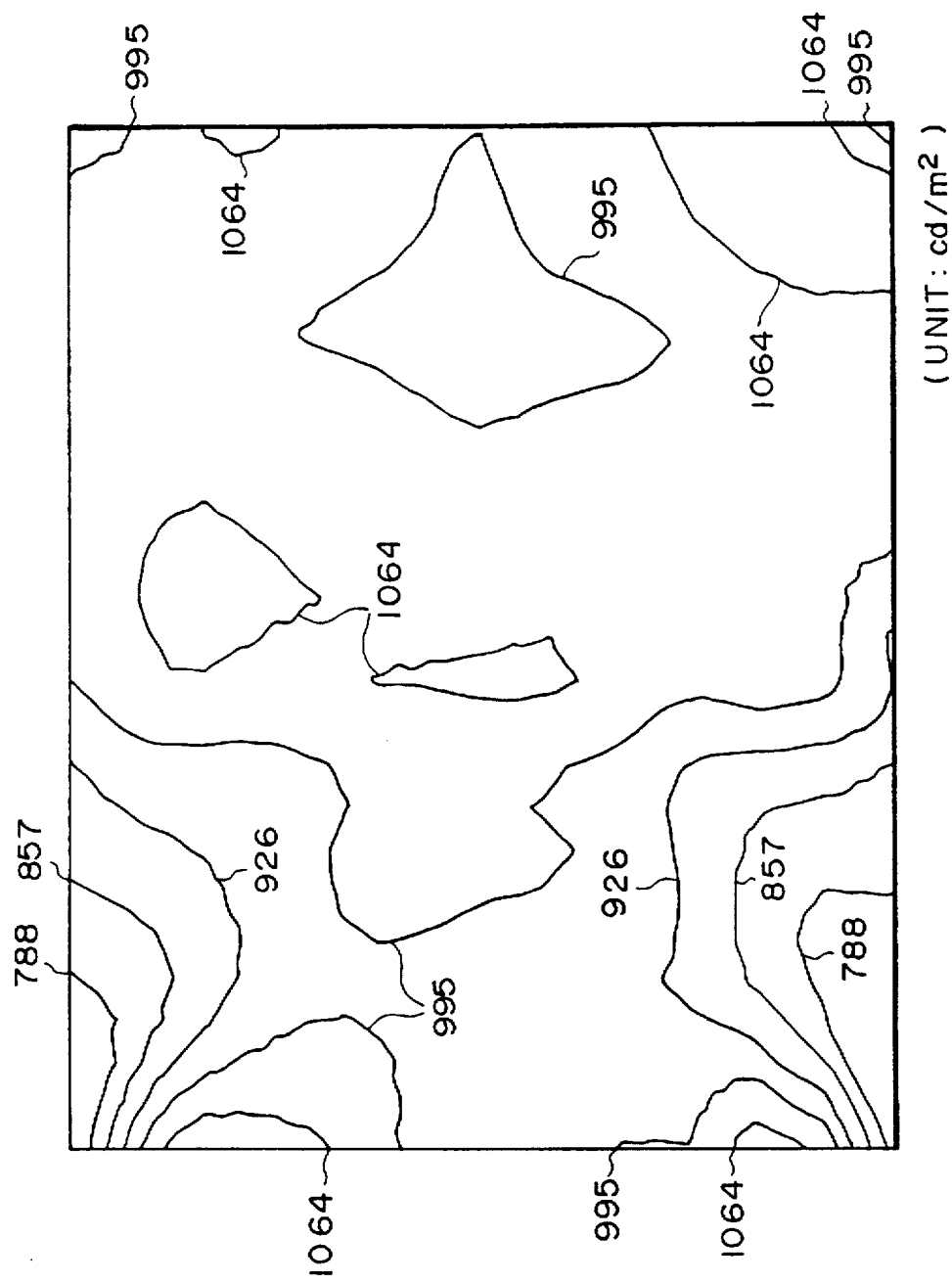
FIG. 38 is a plan view showing a contour line plot of front luminances on the plane light source unit using the light guide 323 according to the sixth embodiment of the present invention.

FIG. 38 shows the contour line distribution of the front luminances in the effective emission region 235, which is plotted on the basis of the measurement results at the above 165 points. This graph indicates the ratio of each front luminance to the maximum luminance. The observation direction in FIG. 38 is the same as that in FIG. 37.

EXPERIMENT 5

A plane light source unit was constituted by the light guide 323' and the remaining constituent members listed in (2b), and the projections 331' of the light guide 323' were placed to oppose the liquid crystal display element 330. The following were the measurement results under the conditions described in (3b):

maximum luminance value at 165 points: 1113 cd/m$^2$ minimum luminance value at 165 points: 615 cd/m$^2$ average luminance value at 165 points: 909 cd/m$^2$ luminance irregularity (minimum value÷maximum value) at 165 points: 55.2%

Figure 39:
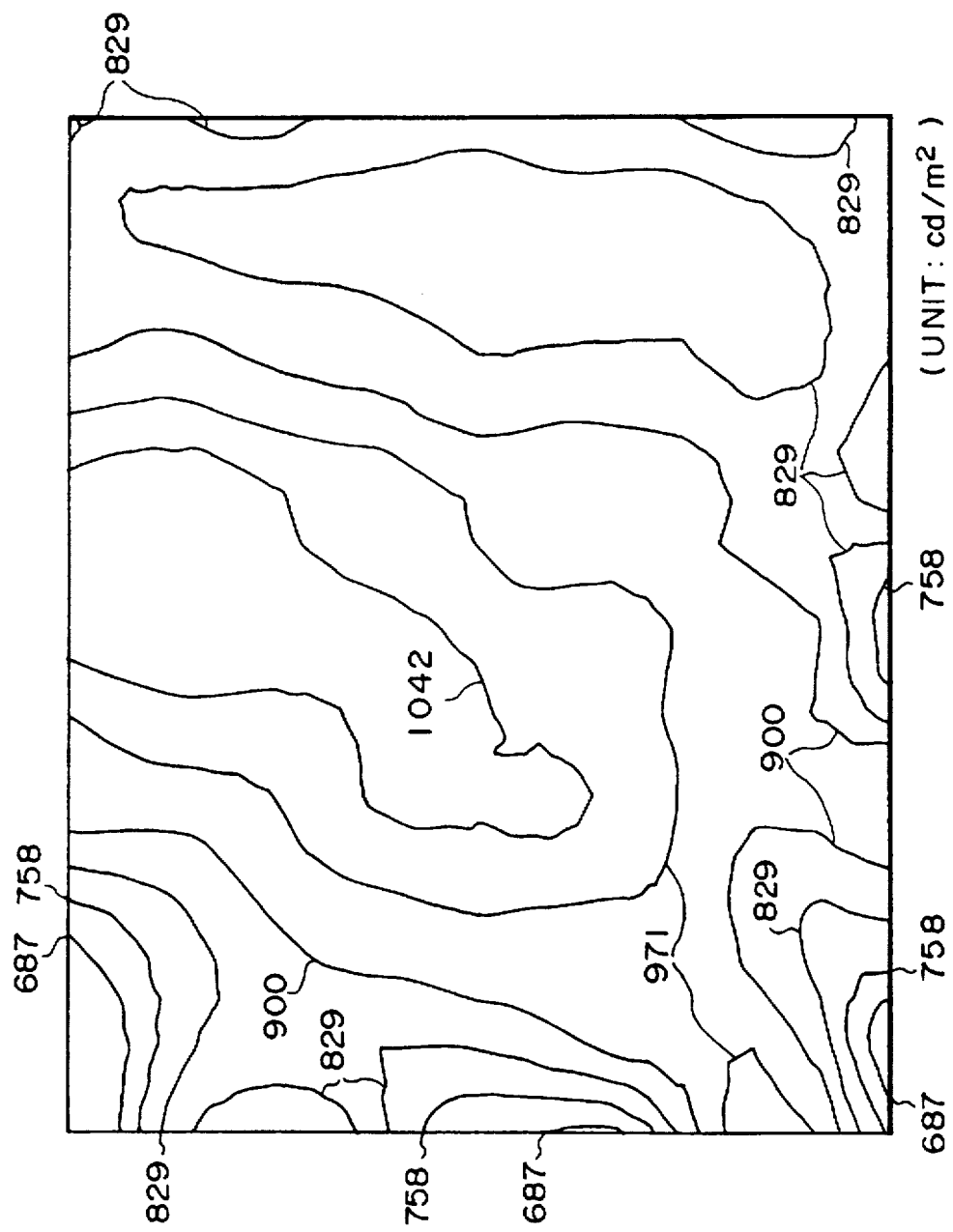
FIG. 39 is a plan view showing a contour line plot of front luminances on the plane light source unit using the comparative light guide 323'.

FIG. 39 shows the contour line distribution of the front luminances in the effective emission region 235, which is plotted on the basis of the measurement results at the above 165 points. The observation direction in FIG. 39 is also the same as that in FIG. 37.

EXPERIMENT 6

A plane light source unit was constituted by the light guide 323" and the remaining constituent members listed in (2b), and the projections 331" of the light guide 323" were placed to oppose the liquid crystal display element 330. The following were the measurement results under the conditions described in (3b):

maximum luminance value at 165 points: 1244 cd/m$^2$ minimum luminance value at 165 points: 599 cd/m$^2$ average luminance value at 165 points: 907 cd/m$^2$ luminance irregularity (minimum value÷maximum value) at 165 points: 48.2%

FIG. 40 shows the contour line distribution of the front luminances in the effective emission region 235, which is plotted on the basis of the measurement results at the above 165 points. The observation direction in FIG. 40 is the same as that in FIG. 37.

The following effects are clarified according to these three experiments.

(a) With the use of the light guide 323, which satisfies 11<A<15 (220<L<270) where A is the average of projection area ratios (%), and $S(x)-3<Rx<S(x)+3$ ($S(x)=e^{g(x)}$, $g(x)=0.00005(x-11)^2+1.1$, and e is the base of a natural logarithm) where Rx is the formation ratio of projections, the intervals between the contour lines are large, and uniform emission occurs in a wide region, as shown in FIG. 38. In addition, a decrease in luminance is suppressed, and the luminance irregularity is as small as 63.8%.

(b) With the use of the comparative light guide 323', which satisfies $A \leq 11$ where A is the average value of projection area rations (%), and $Rx<S(x)-3$ where Rx is the formation ratio of projections, the number of projections which cause light to emerge outside decreases. As shown in FIG. 39, the intervals between the contour lines are small, uniform emission occurs in a narrow region, and a decrease in luminance occurs. The luminance greatly decreases especially in a place spaced apart from the tubular light source 321. Furthermore, the luminance irregularity is as large as 55.2%.

(c) With the use of the comparative light guide 323", which satisfies $A \geq 15$ where A is the average value of projection area rations (%), and $S(x)+3<Rx$ where Rx is the formation ratio of projections, the number of projections which cause light to emerge outside increases. As shown in FIG. 40, the intervals between the contour lines are small, uniform emission occurs in a narrow region, and a decrease in luminance occurs. Furthermore, the luminance irregularity is as large as 48.2%.

What is claimed is:

1. A plane light source unit comprising:

a tubular light source; and a light guide having a light emitting surface and a reflecting surface in addition to a light incident face placed near said tubular light source to receive light emitted from said tubular light source, wherein said light guide has a plurality of projections arrayed on the light emitting surface to extend parallel to each other along a longitudinal direction of said tubular light source so as to cause the light incident from the light incident face to emerge from the light emitting surface, and a height of each of said projections increases from a central portion to two end portions in the longitudinal direction of said tubular light source.

2. A unit according to claim 1, wherein when a ratio of areas of bottom surfaces of the projections to a unit area of an effective emission region of the light emitting surface is defined as a projection area ratio, a projection area ratio of the projections formed on a portion near said tubular light source is different from that of the projections formed on a portion spaced apart from said tubular light source.

3. A unit according to claim 1, wherein an average of arrangement pitches of the projections in the effective emission region of the light emitting surface is not more than 200 μm.

4. A unit according to claim 1, further comprising diffusion means placed near the light emitting surface to guide light emerging from the light emitting surface in a direction perpendicular to the light emitting surface.

5. A unit according to claim 4, wherein said diffusion means controls the emergent light such that a direction of a luminance peak of the light emerging from the diffusion means is set within 30° with respect to a direction perpendicular to the light emitting surface.

6. A unit according to claim 4, wherein said diffusion means has a convergence coefficient of 2 to 4.

7. A unit according to claim 4, wherein said diffusion means has a haze of 70 to 95%.

8. A unit according to claim 4, wherein said diffusion means comprises one diffusion sheet.

9. A unit according to claim 4, wherein said diffusion means comprises two diffusion sheets.

10. A unit according to claim 4, further comprising a collimation sheet for collimating the light emerging from said diffusion means.

11. A unit according to claim 10, wherein said collimation sheet has a plurality of prisms arrayed in a direction substantially coinciding with an array direction of the projections.

12. A unit according to claim 2, wherein the projections are formed to satisfy:

$$15<A<20 \text{ in case of } 100<L<162$$

where the average of the projection area ratios of the projections is defined as A (%), and the length of the effective emission region of the light emitting surface in a direction perpendicular to the light incident face is defined as L (mm).

13. A unit according to claim 12, wherein letting x be a distance (mm) from an emission start position as a side end of the effective emission region which is nearest to said tubular light source to an arbitrary position outside any projection on a straight line passing through a center of the effective emission region of the light emitting surface and crossing the light incident face at a right angle, and Rx be a projection formation ratio which is a ratio of a total length of bases of all the projections present within a predetermined distance from a start point as a start position of the projection nearest to the position x to an end point as a predetermined position in a direction opposite a light incident face direction to the predetermined distance, the projections are formed to satisfy:

$$S(x)-5<Rx<S(x)+5$$

for $S(x)=e^{f(x)}$ wherein e is the base of a natural logarithm, $f(x)=0.00005(x+65)^2+1.3$, $S(x)=5$ when $S(x)<5$, and $S(x)=95$ when $S(x)>95$, provided that when the end point is outside any projection, a start position of a first projection counted from the end position in the direction opposite the light incident face direction is regarded as an end point, and when the end point is present on a projection, a start position of the projection on which the end point is present is regarded as an end point.

14. A unit according to claim 12, wherein the projection has a prism-like shape without any undercut.

15. A unit according to claim 14, wherein the projection satisfies the following inequality on a straight line passing through a center of the effective emission region of the light emitting surface and crossing the light incident face at a right angle:

$$3.0>(\text{length of base of prism})/(\text{height of prism})>1.0.$$

16. A unit according to claim 12, wherein the projection area ratio of the projections gradually increases from a central portion of the light incident face toward end portions of the light incident face in a direction parallel to the light incident face.

17. A unit according to claim 2, wherein the projections are formed to satisfy:

$$11<A<15 \text{ in case of } 220<L<270$$

where A is the average (%) of the projection area ratios of the projections, and L is the length (mm) of the effective emission region of the light emitting surface in a direction perpendicular to the light incident face.

18. A unit according to claim 17, wherein letting x be a distance (mm) from an emission start position as a side end of the effective emission region which is nearest to said tubular light source to an arbitrary position outside any projection on a straight line passing through a center of the effective emission region of the light emitting surface and crossing the light incident face at a right angle, and Rx be a projection formation ratio which is a ratio of a total length of bases of all the projections present within a predetermined distance from a start point as a start position of the projection nearest to the position x to an end point as a predetermined position in a direction opposite a light incident face direction to the predetermined distance, the projections are formed to satisfy:

$$S(x)-3<Rx<S(x)+3$$

for $S(x)=e^{g(x)}$
wherein e is the base of a natural logarithm, and $g(x)=0.00005(x-11)^2+1.1$, provided that when the end point is outside any projection, a start position of a first projection counted from the end position in the direction opposite the light incident face direction is regarded as an end point, and when the end point is present on a projection, a start position of the projection on which the end point is present is regarded as an end point.

19. A unit according to claim 17, wherein the projection has a prism-like shape without any undercut.

20. A unit according to claim 19, wherein the projection satisfies the following inequality on a straight line passing through a center of the effective emission region of the light emitting surface and crossing the light incident face at a right angle:

$$3.0>(\text{length of base of prism})/(\text{height of prism})>1.0.$$

21. A unit according to claim 17, wherein the projection area ratio of the projections gradually increases from a central portion of the light incident face toward end portions of the light incident face in a direction parallel to the light incident face.

22. A plane light source unit comprising:
a tubular light source; and
a light guide having a light emitting surface and a reflecting surface in addition to a light incident face placed near said tubular light source to receive light emitted from said tubular light source,
wherein said light guide has a plurality of grooves arrayed in the light emitting surface and to extend parallel to each other along a longitudinal direction of said tubular light source so as to cause the light incident from the light incident face to emerge from the light emitting surface, and a depth of each of said grooves increases from a central portion to two end portions in the longitudinal direction of said tubular light source.

23. A unit according to claim 22, wherein when a ratio of areas of bottom surfaces of the grooves to a unit area of an effective emission region of the light emitting surface is defined as an opening area ratio, an opening area ratio of the grooves formed in a portion near said tubular light source is different from that of the grooves formed in a portion spaced apart from said tubular light source.

24. A unit according to claim 22, wherein an average of arrangement pitches of the grooves in the effective emission region of the light emitting surface is not more than 200 μm.

25. A unit according to claim 22, further comprising diffusion means placed near the light emitting surface to guide light emerging from the light emitting surface in a direction perpendicular to the light emitting surface.

26. A unit according to claim 25, wherein said diffusion means controls the emergent light such that a direction of a luminance peak of the light emerging from the diffusion means is set within 30° with respect to a direction perpendicular to the light emitting surface.

27. A unit according to claim 25, wherein said diffusion means has a convergence coefficient of 2 to 4.

28. A unit according to claim 25, wherein said diffusion means has a haze of 70 to 95%.

29. A unit according to claim 25, wherein said diffusion means comprises one diffusion sheet.

30. A unit according to claim 25, wherein said diffusion means comprises two diffusion sheets.

31. A unit according to claim 25, further comprising a collimation sheet for collimating the light emerging from said diffusion means.

32. A unit according to claim 31, wherein said collimation sheet has a plurality of prisms arrayed in a direction substantially coinciding with an array direction of the grooves.

33. A light guide used for a plane light source unit, comprising:
an incident face which is one end face of said light guide and placed near a tubular light source to receive light emitted from the tubular light source;
a reflecting surface which is one major surface of said light guide and substantially perpendicular to the light incident face; and
a light emitting surface which is the other major surface of said light guide on an opposite side to said reflecting surface and substantially perpendicular to said light incident face,
wherein a plurality of projections are arrayed on the light emitting surface to extend parallel to each other along a longitudinal direction of said tubular light source so as to cause the light incident from the light incident face to emerge from the light emitting surface, and a height of each of said projections increases from a central portion to two end portions in the longitudinal direction of said tubular light source.

34. A light guide according to claim 33, wherein when a ratio of areas of bottom surfaces of the projections to a unit area of an effective emission region of the light emitting surface is defined as a projection area ratio, a projection area ratio of the projections formed on a portion near said tubular light source is different from that of the projections formed on a portion spaced apart from said tubular light source.

35. A light guide according to claim 33, wherein an average of arrangement pitches of the projections in the effective emission region of the light emitting surface is not more than 200 μm.

36. A light guide according to claim 34, wherein the projections are formed to satisfy:

$$15<A<20 \text{ in case of } 100<L<162$$

where A is the average (%) of the projection area ratios of the projections, and L is the length (mm) of the effective emission region of the light emitting surface in a direction perpendicular to the light incident face.

37. A light guide according to claim 36, wherein letting x be a distance (mm) from an emission start position as a side end of the effective emission region which is nearest to said tubular light source to an arbitrary position outside any projection on a straight line passing through a center of the effective emission region of the light emitting surface and crossing the light incident face at a right angle, and Rx be a projection formation ratio which is a ratio of a total length of bases of all the projections present within a predetermined distance from a start point as a start position of the projection nearest to the position x to an end point as a predetermined position in a direction opposite a light incident face direction to the predetermined distance, the projections are formed to satisfy:

$$S(x)-5<Rx<S(x)+5$$

for $S(x)=e^{f(x)}$
wherein e is the base of a natural logarithm, $f(x)=0.00005(x+65)^2+1.3$, $S(x)=5$ when $S(x)<5$, and $S(x)=95$ when $S(x)>95$, provided that when the end point is outside any projection, a start position of a first projection counted from the end position in the direction opposite the light incident face direction is regarded as an end point, and when the end point is present on a projection, a start position of the projection on which the end point is present is regarded as an end point.

38. A light guide according to claim 36, wherein the projection has a prism-like shape without any undercut.

39. A light guide according to claim 38, wherein the projection satisfies the following inequality on a straight line passing through a center of the effective emission region of the light emitting surface and crossing the light incident face at a right angle:

$$3.0>(\text{length of base of prism})/(\text{height of prism})>1.0.$$

40. A light guide according to claim 36, wherein the projection area ratio of the projections gradually increases from a central portion of the light incident face toward end portions of the light incident face in a direction parallel to the light incident face.

41. A light guide according to claim 34, wherein the projections are formed to satisfy:

$$11<A<15 \text{ in case of } 220<L<270$$

where A is the average (%) of the projection area ratios of the projections, and L is the length (mm) of the effective emission region of the light emitting surface in a direction perpendicular to the light incident face.

42. A light guide according to claim 41, wherein letting x be a distance (mm) from an emission start position as a side end of the effective emission region which is nearest to said tubular light source to an arbitrary position outside any projection on a straight line passing through a center of the effective emission region of the light emitting surface and crossing the light incident face at a right angle, and Rx be a projection formation ratio which is a ratio of a total length of bases of all the projections present within a predetermined distance from a start point as a start position of the projection nearest to the position x to an end point as a predetermined position in a direction opposite a light incident face direction to the predetermined distance, the projections are formed to satisfy:

$$S(x)-3<Rx<S(x)+3$$

for $S(x)=e^{g(x)}$
wherein e is the base of a natural logarithm, and $g(x)=0.00005(x-11)^2+1.1$, provided that when the end point is outside any projection, a start position of a first projection counted from the end position in the direction opposite the light incident face direction is regarded as an end point, and when the end point is present on a projection, a start position of the projection on which the end point is present is regarded as an end point.

43. A light guide according to claim 41, wherein the projection has a prism-like shape without any undercut.

44. A light guide according to claim 43, wherein the projection satisfies the following inequality on a straight line passing through a center of the effective emission region of the light emitting surface and crossing the light incident face at a right angle:

$$3.0>(\text{length of base of prism})/(\text{height of prism})>1.0.$$

45. A light guide according to claim 41, wherein the projection area ratio of the projections gradually increases from a central portion of the light incident face toward end portions of the light incident face in a direction parallel to the light incident face.

46. A light guide used for a plane light source unit, comprising:

an incident face which is one end face of said light guide and placed near a tubular light source to receive light emitted from the tubular light source;

a reflecting surface which is one major surface of said light guide and substantially perpendicular to the light incident face; and a light emitting surface which is the other major surface of said light guide on an opposite side to said reflecting surface and substantially perpendicular to said light incident face, wherein a plurality of grooves are arrayed in the light emitting surface to extend parallel to each other along a longitudinal direction of said tubular light source so as to cause the light incident from the light incident face to emerge from the light emitting surface, and a depth of each of said grooves increases from a central portion to two end portions in the longitudinal direction of said tubular light source.

47. A light guide according to claim 46, wherein when a ratio of areas of opening portions of the grooves to a unit area of an effective emission region of the light emitting surface is defined as an opening area ratio, an opening area ratio of the grooves formed in a portion near said tubular light source is different from that of the grooves formed in a portion spaced apart from said tubular light source.

48. A light guide according to claim 46, wherein an average of arrangement pitches of the grooves in the effective emission region of the light emitting surface is not more than 200 μm.

* * * * *